US010679090B2

(12) United States Patent
Myeong et al.

(10) Patent No.: US 10,679,090 B2
(45) Date of Patent: Jun. 9, 2020

(54) METHOD FOR ESTIMATING 6-DOF RELATIVE DISPLACEMENT USING VISION-BASED LOCALIZATION AND APPARATUS THEREFOR

(71) Applicant: Korea Advanced Institute of Science and Technology, Daejeon (KR)

(72) Inventors: Hyeon Myeong, Daejeon (KR); Su Young Choi, Daejeon (KR); Wancheol Myeong, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 144 days.

(21) Appl. No.: 15/979,142

(22) Filed: May 14, 2018

(65) Prior Publication Data
US 2019/0180134 A1   Jun. 13, 2019

(30) Foreign Application Priority Data

Dec. 12, 2017  (KR) .................. 10-2017-0170418
Apr. 13, 2018  (KR) .................. 10-2018-0043199

(51) Int. Cl.
*G06K 9/46* (2006.01)
*G06T 5/20* (2006.01)
(Continued)

(52) U.S. Cl.
CPC ............... *G06K 9/46* (2013.01); *G06T 5/003* (2013.01); *G06T 5/20* (2013.01); *G06T 7/74* (2017.01);
(Continued)

(58) Field of Classification Search
CPC combination set(s) only.
See application file for complete search history.

(56) References Cited

U.S. PATENT DOCUMENTS 9,734,589 B2 *   8/2017   Yu ................... G06K 9/00335
2014/0105486 A1 *   4/2014   Tamaazousti ........ G06T 7/579
382/154
(Continued)

FOREIGN PATENT DOCUMENTS

KR   10-2016-0119412   10/2016

OTHER PUBLICATIONS

Choi et al., "A Vision-based 6-DOF Displacement Measurement System using Multiple Planar Markers for Precise Assemble of PC Members," 2016 16$^{th}$ International Conference on Control, Automation and Systems (ICCAS 2016), Oct. 16-19, 2016, pp. 1036-1039.
(Continued)

*Primary Examiner* — Tsung Yin Tsai
(74) *Attorney, Agent, or Firm* — Foley & Lardner LLP

(57) ABSTRACT

A method for estimating 6-DOF relative displacement using vision-based localization and apparatus therefor are disclosed. A method for estimating 6-DOF relative displacement may include acquiring images of a first marker attached to a fixing member and a second marker attached to a dynamic member for assembling to the fixing member by using a camera, extracting a feature point of the first marker and a feature point of the second marker through image processing for the acquired images, and estimating 6-DOF relative displacement of the dynamic member for the fixing member based on the extracted feature point of the first marker and feature point of the second marker.

17 Claims, 21 Drawing Sheets

(51) Int. Cl.
*G06T 7/73* (2017.01)
*G06T 5/00* (2006.01)
(52) U.S. Cl.
CPC ............... *G06T 2207/20028* (2013.01); *G06T 2207/30204* (2013.01)

(56) References Cited

U.S. PATENT DOCUMENTS

2014/0205140 A1* 7/2014 Lovberg .................. G06T 7/248
382/103
2016/0035108 A1* 2/2016 Yu ...................... G06K 9/00335
382/131
2018/0068441 A1* 3/2018 Yu ........................ A61B 5/0077

OTHER PUBLICATIONS

Cheol et al., "Vision-Based Real Time Displacement Estimation System for Assembly of the Precast Concrete Members," *Korean Society of Civil Engineers*, pp. 1703-1704 (2017).

\* cited by examiner

FIG. 4
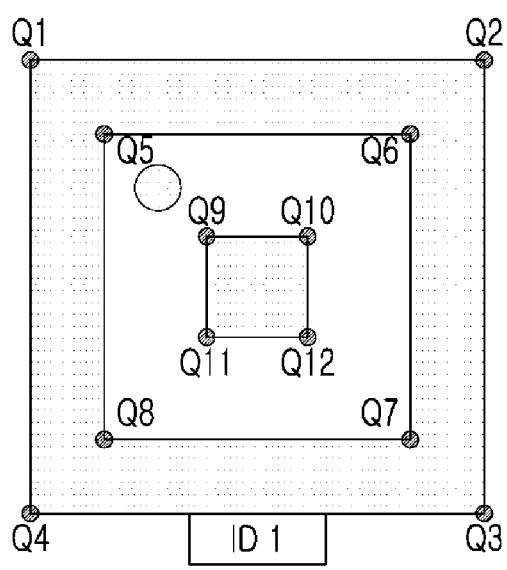
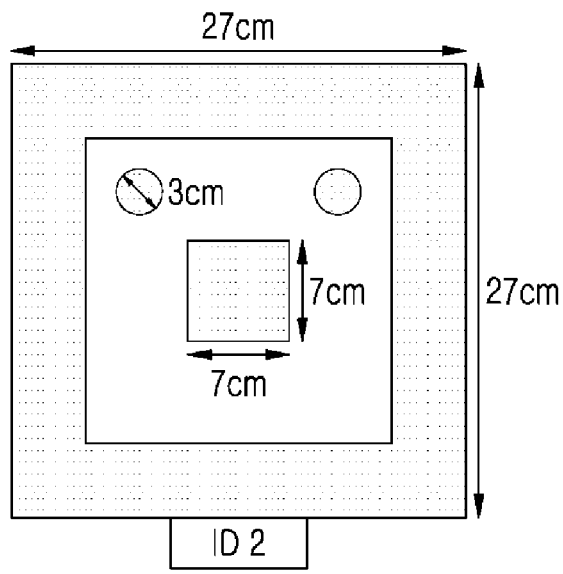
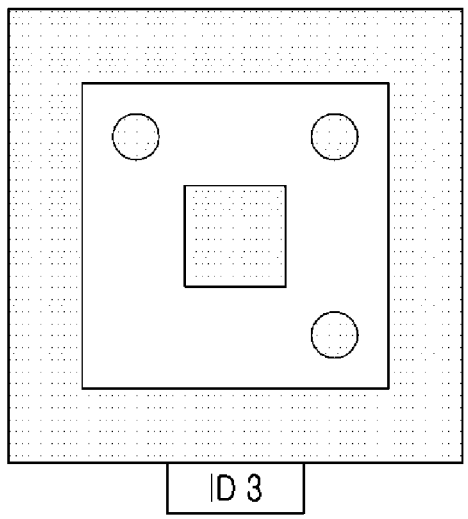
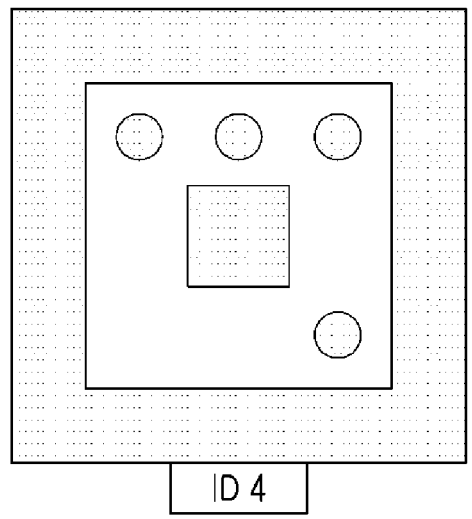

FIG. 11
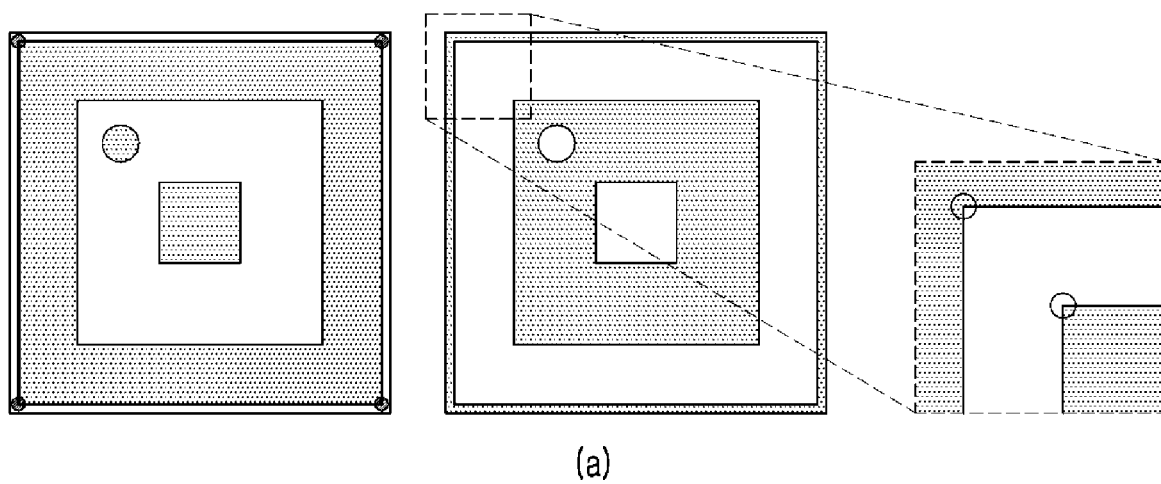
(a)
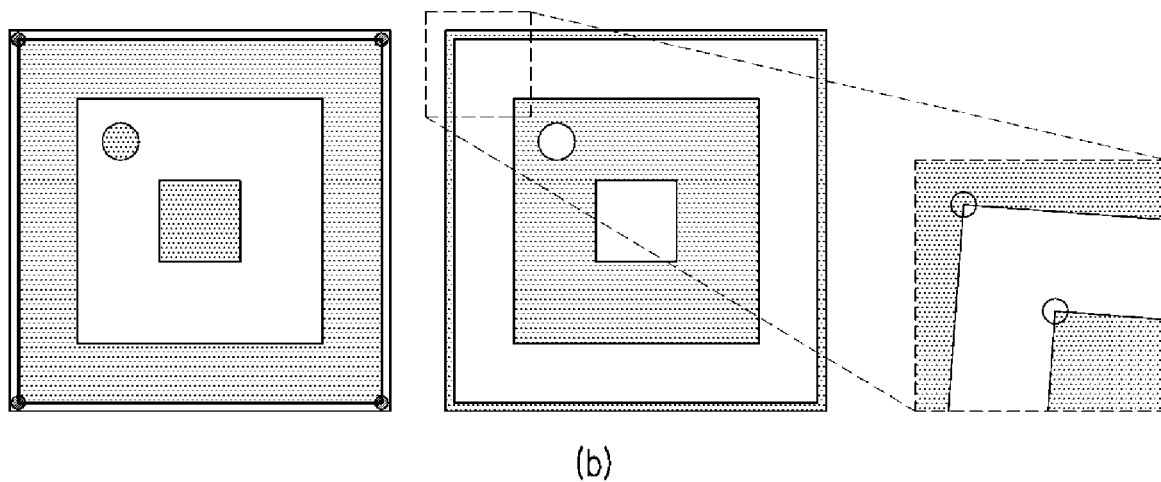
(b)

FIG. 13
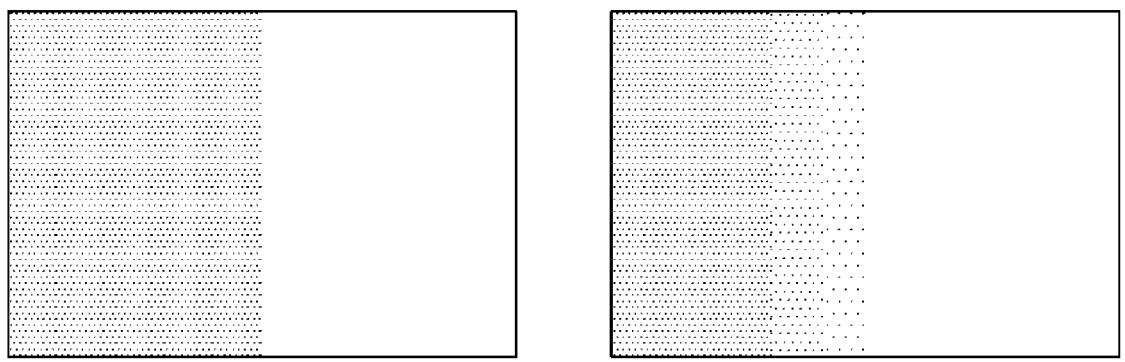
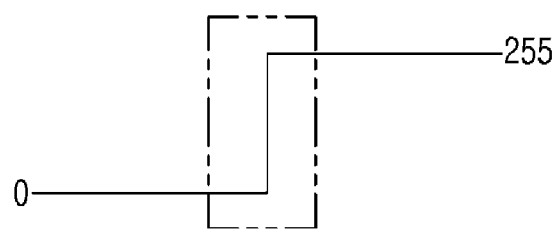
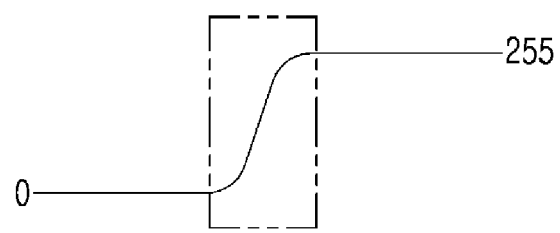
(a)            (b)

FIG. 15
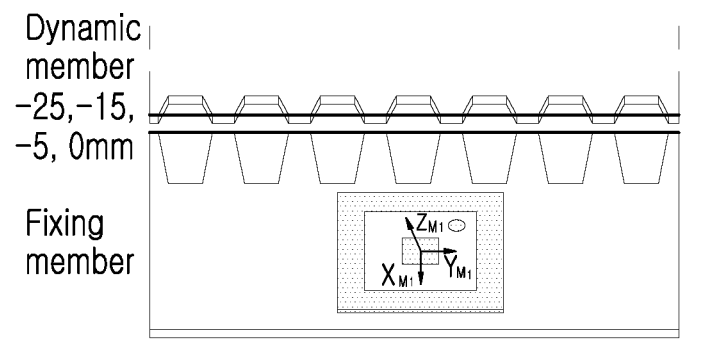
(a)
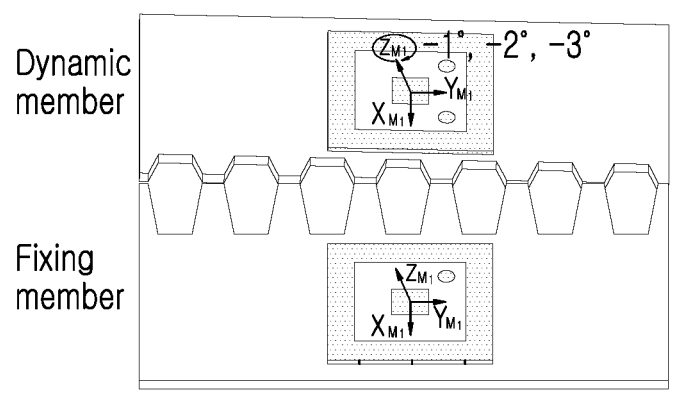
(b)

METHOD FOR ESTIMATING 6-DOF RELATIVE DISPLACEMENT USING VISION-BASED LOCALIZATION AND APPARATUS THEREFOR

This application claims the priority benefit of Korean Patent Application No. 10-2017-0170418, filed on Dec. 12, 2017, and Korean Patent Application No. 10-2018-0043199, filed on Apr. 13, 2018, in the Korean Intellectual Property Office, the disclosure of which is incorporated herein by reference.

BACKGROUND

1. Field of the Invention

The following example embodiments relate to a technology for estimating 6-DOF relative displacement, and more particularly, a method for estimating 6-DOF relative displacement of a dynamic member for a fixing member (or static member) by using a vision-based localization and an apparatus therefor.

2. Description of the Related Art

As recent high growth of economy around the world, fast goods transport is important topic and bridges are actively constructed.

To meet steady demand for bridge construction, methods of constructing bridge have been developed. Generally, a cast-in-place method casting concrete at a site has been used in constructing bridges, roads, expressways, and the like. This is a method for constructing structure by casting concrete in a mold and making a desired shape at a construction site. Because the cast-in-place method casts concrete in an opened environment, there is a disadvantage that additional cost is often incurred to re-cast concrete when a concrete member of desired quality is not obtained. Also, when constructing bridges in large cities, detours are made or driveways are blocked, which greatly affects the volume of traffic. Therefore, although it is important to construct fast, time delay occurring in the cast-in-place method occurs. Accordingly, new methods that may substitute for the existing method have been studied.

One of the methods is a Precast Concrete method. The PC (Precast Concrete) method is not a method for making concrete members at a construction site but a method for mass-producing concrete members having a desired shape and size according to a predetermined process at a certain place. Because the PC method is to make concrete members in large quantities as many as people want in advance, transport them to a site, and assemble them in the site, it is helpful to solve the problem of traffic volume of roads caused by making detours or blocking driveways for cast-in-place concrete. Also, because the concrete members are produced in a standardized process, quality management is excellent compared to the cast-in-place method, and cost and construction period may be reduced. In case of bridges of the PC method, because concrete members corresponding to damage part may be replaced when partially damage or destruction and aging of the bridges occur, it is cost effective and practical. Despite many advantages, there is a disadvantage in the PC method. The PC method requires precise assembly of precast members because it is necessary to assemble divided precast concrete (precast members, floor plate) at a site. After the precast members are lifted by a crane and transported to near place where the members should be put, the member and the member are assembled through communication depending on gestures or voice of crane operators and workers. There is a limit to precisely and fast assemble the members by depending on the gestures and voice of the workers and crane operators, and when the communication is not good, it often happens that the advantage of the PC method which is the reduction of construction period does not work.

The present invention proposes a method for precisely assembling a dynamic member to a fixing member by accurately estimating real-time 6-DOF relative displacement of the dynamic member lifted by a crane operator compared to already assembled fixing member when assembling next member (dynamic member) to the already assembled fixing member (or static member).

SUMMARY

At least one example of embodiments provides a method for estimating 6-DOF relative displacement of a dynamic member for a fixing member (or static member) by using a vision-based localization and an apparatus therefor.

Particularly, at least one example of embodiments provides a method for precisely estimating a location of a member when occlusion of a marker by a dynamic member or blur on a camera image by member moving occurs and an apparatus therefor.

According to at least one example embodiment, a method for estimating 6-DOF relative displacement includes acquiring images of a first marker attached to a fixing member and a second marker attached to a dynamic member for assembling to the fixing member by using a camera; extracting a feature point of the first marker and a feature point of the second marker through image processing for the acquired images; and estimating 6-DOF relative displacement of the dynamic member for the fixing member based on the extracted feature point of the first marker and feature point of the second marker.

The estimating 6-DOF relative displacement may estimate 6-DOF relative displacement between the camera and the first marker by using the extracted feature point of the first marker, estimate 6-DOF relative displacement between the camera and the second marker by using the extracted feature point of the second marker, and estimate 6-DOF relative displacement of the dynamic member for the fixing member based on the 6-DOF relative displacement between the camera and the first marker and the 6-DOF relative displacement between the camera and the second marker.

The estimating 6-DOF relative displacement may estimate the 6-DOF relative displacement by using a homography estimation method.

The estimating 6-DOF relative displacement may estimate 6-DOF relative displacement of the dynamic member for the fixing member by using a homography estimation method, and estimate final 6-DOF relative displacement of the dynamic member for the fixing member by using a probability-based location estimation method which inputs the 6-DOF relative displacement of the dynamic member estimated by the homography estimation method.

The estimating 6-DOF relative displacement may initialize particles based on the 6-DOF relative displacement estimated by the homography estimation method, perform sampling by applying change amount of the 6-DOF relative displacement to the initialized particles, reset importance weight for each of particles through normalization process after calculating importance weight of each of the sampled particles, and estimate the final 6-DOF relative displacement based on average of particles having the predetermined number of top importance weights among the reset importance weights.

The extracting a feature point may convert the acquired images to gray images and then preprocess them by using a bilateral filter, convert the preprocessed gray images to binarization images, and extract the feature point of the first marker and the feature point of the second marker from the binarization images by using a blob algorithm.

Furthermore, according to at least one example embodiment, a method for estimating 6-DOF relative displacement may further include visualizing the dynamic member with respect to the fixing member based on the estimated 6-DOF relative displacement.

The first marker and the second marker may have different identification information, and include a plurality of corner points corresponding to the feature point.

According to another aspect of at least one example embodiment, a method for estimating 6-DOF relative displacement includes acquiring images of a first marker attached to a fixing member and a second marker attached to a dynamic member for assembling to the fixing member by using a camera; extracting a feature point of the first marker and a feature point of the second marker through image processing for the acquired images; determining whether there is at least partially occlusion or blur for the markers from the acquired images, and selecting any one method among a homography estimation method and a probability-based location estimation method based on the determining result; and estimating 6-DOF relative displacement of the dynamic member for the fixing member based on the selected any one method, the extracted feature point of the first marker and feature point of the second marker.

The selecting any one method may select the probability-based location estimation method when at least partially occlusion occurs for the markers, select the homography estimation method if a second average is above a first average by comparing the first average for distance difference between pixel point of linear equation inferred from feature point of corresponding marker in importance weight operation of the probability-based location estimation method and each edge of the corresponding marker and the second average for distance difference between the pixel point and particle having the largest importance weight of the probability-based location estimation method when the at least partially occlusion does not occur and the blur occurs, and select the probability-based location estimation method if the second average is below the first average.

According to another aspect of at least one example embodiment, an apparatus for estimating 6-DOF relative displacement includes an acquiring unit configured to acquire images of a first marker attached to a fixing member and a second marker attached to a dynamic member for assembling to the fixing member by using a camera; an extracting unit configured to extract a feature point of the first marker and a feature point of the second marker through image processing for the acquired images; and an estimating unit configured to estimate 6-DOF relative displacement of the dynamic member for the fixing member based on the extracted feature point of the first marker and feature point of the second marker.

The estimating unit may estimate 6-DOF relative displacement between the camera and the first marker by using the extracted feature point of the first marker, estimate 6-DOF relative displacement between the camera and the second marker by using the extracted feature point of the second marker, and estimate 6-DOF relative displacement of the dynamic member for the fixing member based on the 6-DOF relative displacement between the camera and the first marker and the 6-DOF-relative displacement between the camera and the second marker.

The estimating unit may initialize particles based on the 6-DOF relative displacement estimated by the homography estimation method, perform sampling by applying change amount of the 6-DOF relative displacement to the initialized particles, reset importance weight for each of particles through normalization process after calculating importance weight of each of the sampled particles, and estimate the final 6-DOF relative displacement based on average of particles having the predetermined number of top importance weights among the reset importance weights.

Furthermore, according to at least one example embodiment, an apparatus for estimating 6-DOF relative displacement may further include a selecting unit configured to determine whether there is at least partially occlusion and blur for the markers from the acquired images, and select any one method among a homography estimation method and a probability-based location estimation method based on the determining result, and the estimating unit may estimate 6-DOF relative displacement of the dynamic member for the fixing member based on the selected one method, the extracted feature point of the first marker and feature point of the second marker.

The selecting unit may select the probability-based location estimation method when at least partially occlusion occurs for the markers, select the homography estimation method if a second average is above a first average by comparing the first average for distance difference between pixel point of linear equation inferred from feature point of corresponding marker in importance weight operation of the probability-based location estimation method and each edge of the corresponding marker and the second average for distance difference between the pixel point and particle having the largest importance weight of the probability-based location estimation method when the at least partially occlusion does not occur and the blur occurs, and select the probability-based location estimation method if the second average is below the first average.

According to another aspect of at least one example embodiment, a system for estimating 6-DOF relative displacement include an acquiring unit configured to acquire images of a first marker attached to a fixing member and a second member attached to a dynamic member for assembling to the fixing member by using a camera; an extracting unit configured to extract a feature point of the first marker and a feature point of the second marker through image processing for the acquired images; an estimating unit configured to estimate 6-DOF relative displacement of the dynamic member for the fixing member based on the extracted feature point of the first marker and feature point of the second marker; and a visualizing unit configured to visualize the dynamic member with respect to the fixing member based on the estimated 6-DOF relative displacement.

According to example embodiments, although occlusion of a marker by a dynamic member or blur on a camera image by member moving occurs, a relative location of the dynamic member for a fixing member may be precisely estimated.

According to example embodiments, 6-DOF relative displacement of a dynamic member for a fixing member is estimated by using a vision-based localization, and the dynamic member is precisely and fast assembled to the fixing member by visualizing and providing the information to an operator lifting a member, for example, a crane operator. Therefore, construction period may be reduced.

According to example embodiments, estimation error for 6-DOF relative displacement of a member may be reduced by estimating 6-DOF relative displacement of a dynamic member by using a fusion method or a hybrid method selectively using at least one among a homography estimation method and a probability-based location estimation method, for example, MCL (Monte Carlo Localization) method.

The technology according to the present invention may be applied to assembling system between precast concrete members, real-time displacement and location estimation system of large-scale constructing structures, and docking system of various industries such as ship, flight, logistics, and the like.

Also, the technology according to the present invention may be applied to all systems relating to location tracking, assembly, docking at construction and industrial sites, so time of the existing process may be reduced and high-quality products may be expected. In addition, rapid construction may be possible by systemizing and making high precisely assembling constriction of precast concrete members which were previously relied on manpower.

BRIEF DESCRIPTION OF THE DRAWINGS

These and/or other aspects, features, and advantages of the invention will become apparent and more readily appreciated from the following description of embodiments, taken in conjunction with the accompanying drawings of which:

FIG. 4 illustrates an example of marker forms according to an example of embodiments;

FIG. 11 illustrates an example of comparison according to image blur;

FIG. 13 illustrates an example of change of surrounding pixel according to blur;

FIG. 15 illustrates an example of linear motion and rotational motion of dynamic member;

DETAILED DESCRIPTION

Figure 1:
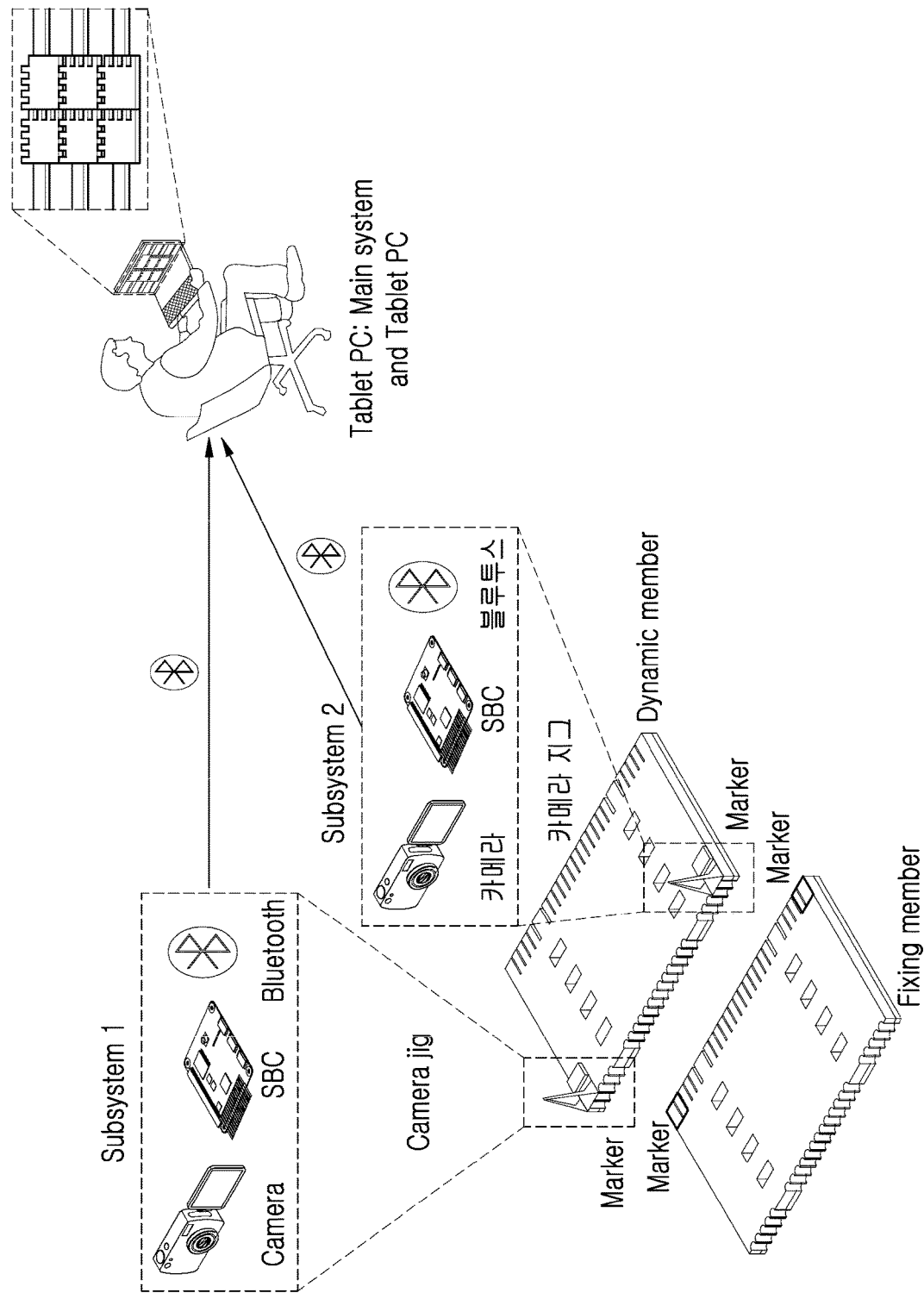
FIG. 1 illustrates an example of a system for estimating 6-DOF relative displacement according to an example of embodiments.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings.

The example embodiments of the present invention have a main point for precisely estimating a location of a dynamic member when occlusion of a marker by a dynamic member, for example, a member transported by a crane operator (hereinafter, "dynamic member") or blur on a camera image by member moving occurs.

Here, the present invention may precisely estimate relative displacement of a dynamic member by determining any method among a homography estimation method and a probability-based location estimation method, for example, MCL (Monte Carlo Localization) method depending on how precisely a marker corner point (or feature point) is estimated. For example, the present invention may select any one method of the homography estimation method and the probability-based location estimation method based on re-projection error of a feature point projected to an image and estimate optimal 6-DOF relative displacement by using the selected method. Errors may be reduced by using the homography estimation method having higher accuracy/precision in an environment where blur does not occur on a marker image and by using the probability-based location estimation method such as MCL method when a marker is occluded or blur occurs on a marker image.

Also, the present invention may estimate 6-DOF relative displacement of a dynamic member for a fixing member by using a vision-based localization, and precisely and fast assemble the dynamic member to the fixing member by visualizing and providing the information to an operator lifting a member, for example, a crane operator. Through this, construction period may be reduced.

The present invention provides a guide method, an apparatus, and a system helping a crane operator to precisely and fast assemble precast members when assembling members such as precast members at bridge constructing site, and the system may be a system based on multiple markers and a camera for estimating or measuring 6-DOF relative displacement of a precast member. For example, the present invention attaches a marker to already assembled precast member (hereinafter, "fixing member" or "static member") and installs a camera and a marker having different ID on a precast member lifted by a crane, i.e., a dynamic member, and then, calculates pixel coordinate of a corner point or a feature point of each of markers through image processing after acquiring images of two markers by the camera. Also, 6-DOF relative displacement of the dynamic member may be estimated through geometric relation between corner point coordinate of a marker on an image plane and a location where the marker is installed. This method is called as a homography method, and when blur occurs on an image of a marker, many errors may occur if the homography estimation method measuring 6-DOF by using coordinate of a corner point of a marker. Also, when at least part of a mark is occluded, it is difficult to estimate a location with the homography method. In this case, the present invention may precisely estimate or measure 6-DOF relative displacement of a dynamic member by using a probability-based location estimation method, for example, MCL (Monte Carlo Localization) method.

Furthermore, the present invention may more precisely estimate a location by fusing the homography estimation method and MCL method, and 6-DOF information (or 6-DOF relative displacement information) estimated with the above-described method may visualize a real-time location of a dynamic member to a user terminal, for example, a tablet PC through TCP/IP communication. A user, i.e., a crane operator may know a location of a precast member, i.e., a dynamic member which is lifted while watching visualized 3-dimensional screen. Accordingly, because time for assembling a dynamic member to a fixing member may be reduced, whole construction period may be reduced The present invention will be described in detail with reference to FIGS. 1 to 21 as below.

At bridge construction site, because of many advantages of a precast member which is based on partial assembly, precast member-based bridges are constructed. A crane is used to move a precast member, and generally, when a precast member is 10 m or more length, the member is hung up to lifting frame and moved.

FIG. 1 illustrates an example of a system for estimating 6-DOF relative displacement according to an example of embodiments. As illustrated in FIG. 1, markers are installed in a precast member (fixing member or static member) which is already put on girder, and a camera jig is installed in a moving member (dynamic member) by a crane operator. The markers which are installed in the precast member may be installed as a plurality of markers having a different ID, i.e., identification information but having the same form. For example, in the present invention, four markers having different ID may be installed.

The camera jig installed on the dynamic member may be configured with a camera, SBC (Single Board Computer), Bluetooth, and a marker. The camera jig may be integrally configured in order that a worker may quickly install the camera jig on the dynamic member.

As illustrated in FIG. 1, a system of the present invention may include at least one or more subsystems, a main system, and a user terminal, and an apparatus of the present invention may correspond to the subsystem.

Therefore, according to the present invention, a method may include providing visualized information to a user (crane operator) in whole system as well as a process for estimating 6-DOF relative displacement of a dynamic member in a subsystem.

Here, the subsystem may be referred to a camera jig. The jig may be produced with transparent material in order to minimize effect to recognition performance of a marker according to amount of sunshine, and the subsystem may be configured with a camera, SBC, Bluetooth, and a marker. Also, the main system may include Bluetooth which may receive 6-DOF displacement data in the subsystem, a tablet PC, and wireless AP (Access Point) for TCP/IP communication. Configuration of each of systems may be configured in a form of module in order to fast and precisely install at a site.

Figure 2:
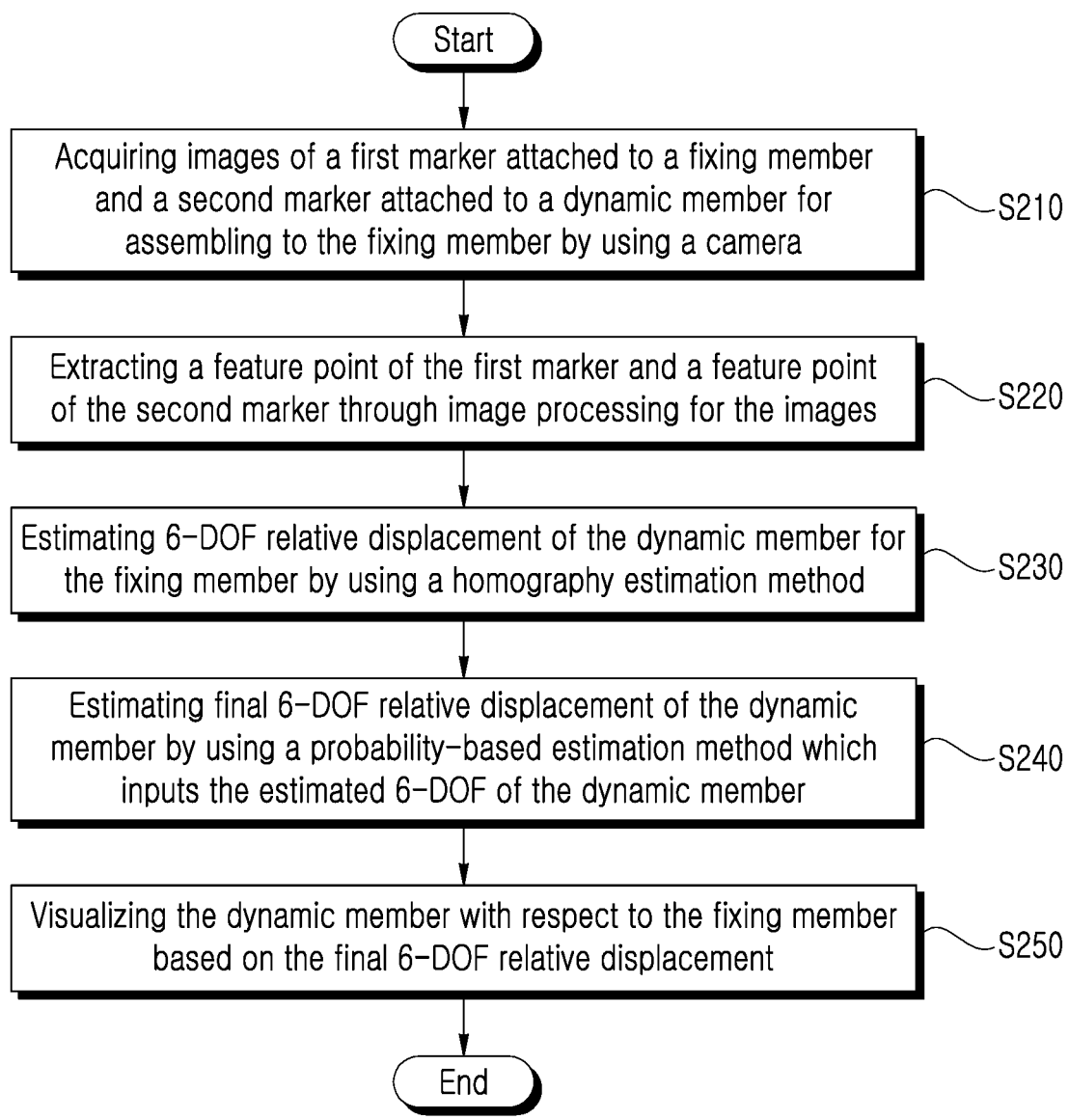
FIG. 2 is an operation flow chart illustrating a method for estimating 6-DOF relative displacement according to an example of embodiments.
Figure 3:
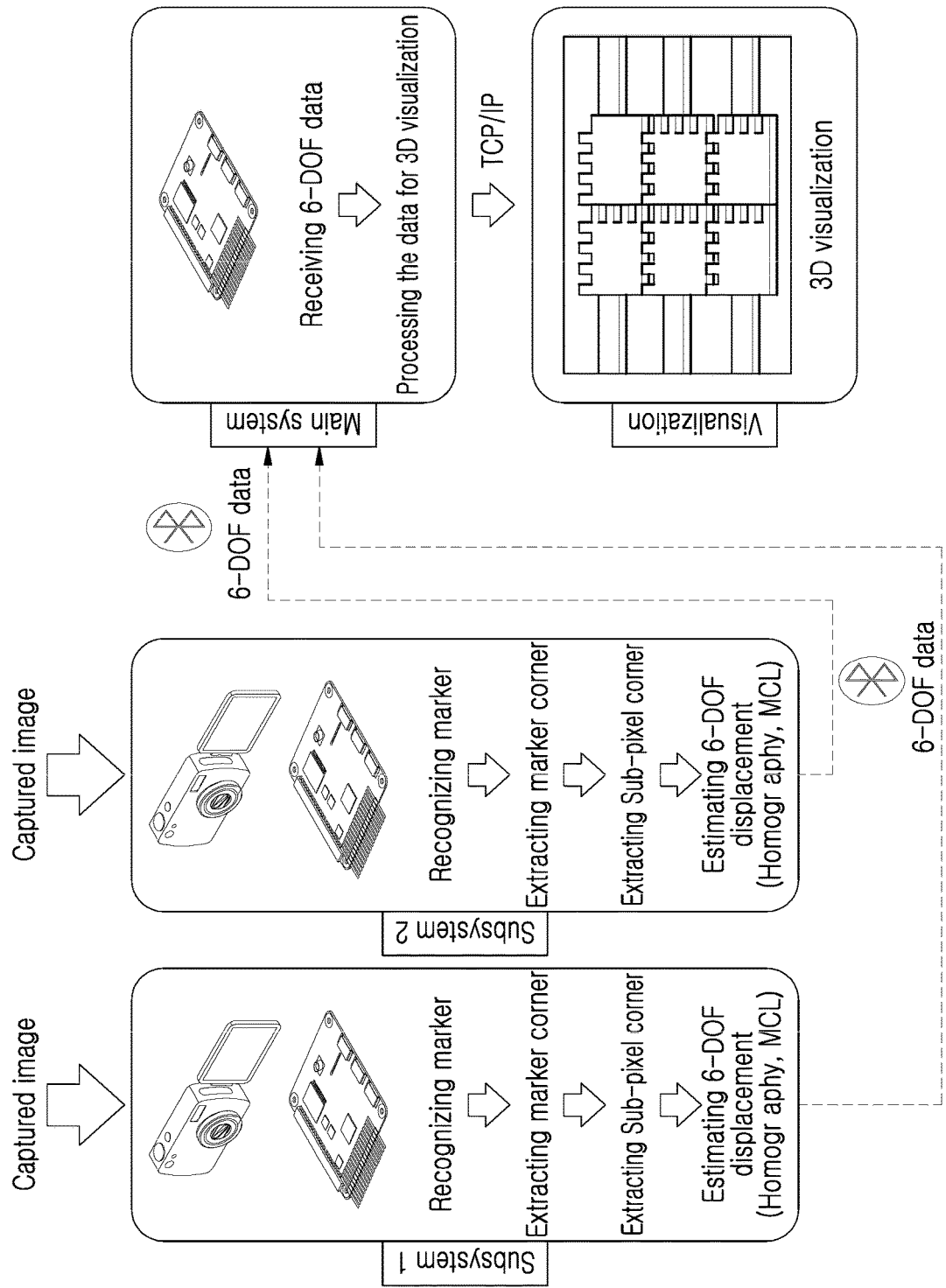
FIG. 3 illustrates an example of a method for estimating 6-DOF relative displacement according to an example of embodiments.

FIG. 2 is an operation flow chart illustrating a method for estimating 6-DOF relative displacement according to an example of embodiments, and FIG. 3 illustrates an example of a method for estimating 6-DOF relative displacement according to an example of embodiments.

Referring to FIGS. 2 and 3, according to the present invention, a method for estimating 6-DOF relative displacement acquires images of a first marker attached to or installed on a fixing member and a second marker attached to a dynamic member for assembling to the fixing member by using a camera which is equipped in a camera jig (S210). In other words, when acquiring captured images by using a camera, an image for two markers having different ID and the same form may be acquired by a camera of Subsystem 1, and an image for two markers having different ID and the same form may be acquired by a camera of Subsystem 2.

When marker images are acquired by operation S210, feature points (or corner points) of two markers, i.e., the first marker and the second marker are extracted through image processing for the acquired marker images (S220).

Here, operation S220 may do image process for the marker images acquired by the camera of the camera jig through SBC, and extract corner points of the markers within a recognized area by recognizing the marker (the first marker) attached to the fixing member and the marker (the second marker) attached to the dynamic member through image processing.

As illustrated in FIG. 4, a marker which is used in the present invention may include ID (or identification information) and a form of marker. The present invention may have total twelve marker corner points to raise performance of relative 6-DOF displacement measurement (or estimation) of a marker and a camera. Surely, the number of corner points of a marker may be determined by considering performance of displacement measurement, calculation complexity, and the like. To show high 6-DOF measurement performance compared to April tag generally using four corner points of a marker, the present invention may use twelve corner points ($Q_1$ to $Q_{12}$). Also, a circle provided in a marker, i.e., the circle in the marker is identification information for distinguishing ID, and the ID of the marker may be different depending on location and the number of the circles. Therefore, according to the number and location of the circles, a marker having various ID may be produced. In FIG. 4, four markers are illustrated, and among the illustrated markers, ID 1 and ID 3 may be located in a precast member (fixing member) which is already assembled and ID 2 and ID 4 which is located in the camera jig may be located in a precast member (dynamic member) moved by a crane operator.

Here, size of each of markers is 27 cm, and size of inner square may be 7 cm. Surely, size and form of each of markers may be different as needed.

Particularly, operation S220 may extract a marker corner through image processing for the acquired images and extract a sub-pixel corner, and in this regards, it will be described with reference to FIG. 5 as below.

Figure 5:
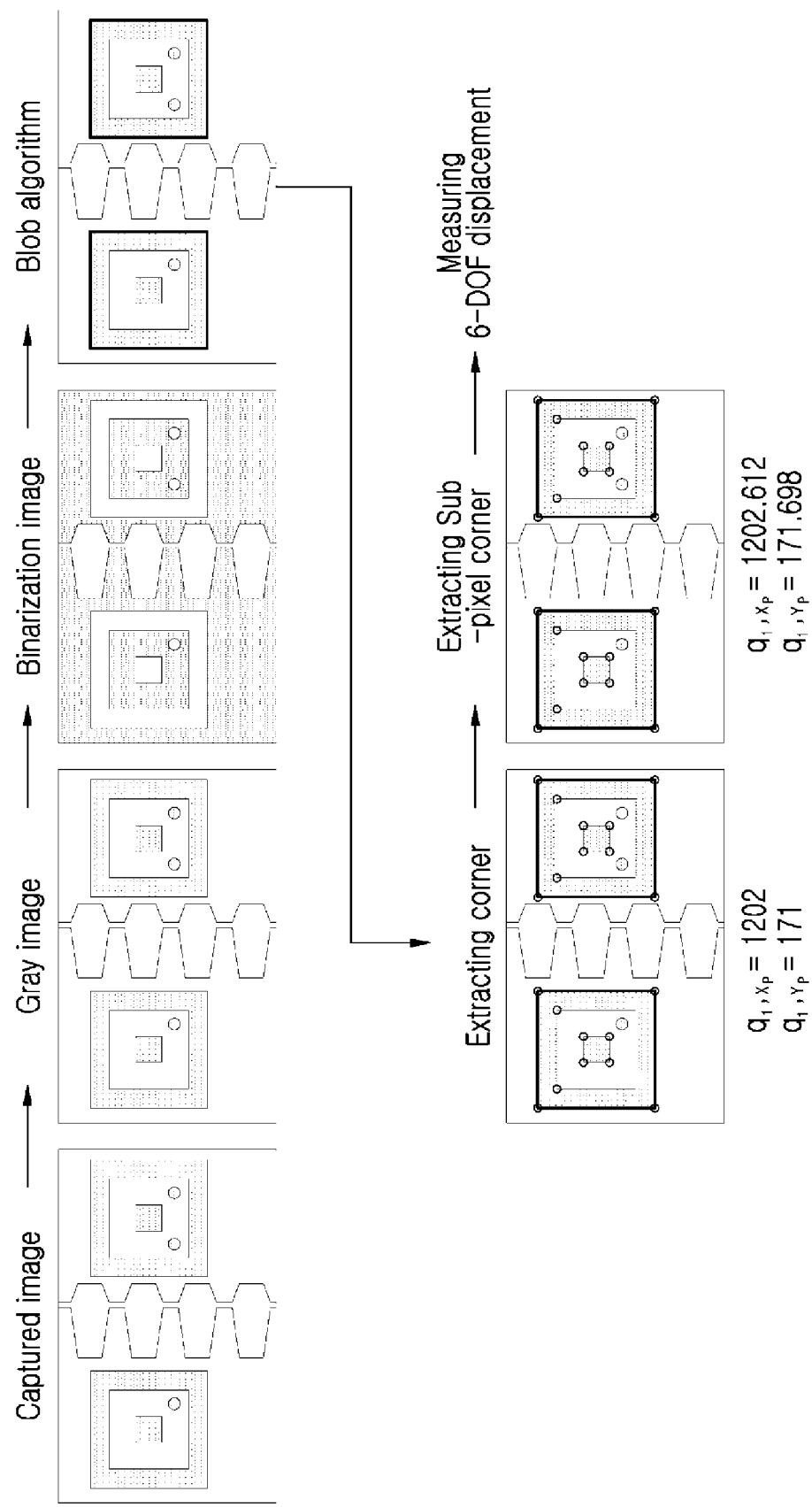
FIG. 5 illustrates an example of image processing for extracting feature point of marker.

As illustrated in FIG. 5, S220 acquires captured images including a form of a marker through a camera, and resolution of the captured images may be 1920×1080 and RGB images. The acquired captured images, i.e., RGB images are converted to gray images of gray level, and after converting to the gray images, the gray images are preprocessed by using a bilateral filter as a preprocessing filter.

A Gaussian filter which is a filter removing noise through convolution with a mask having a Gaussian distribution with pixels on an image is an inappropriate filter in order to acquire precise corner information of a marker because the Gaussian filter has an effect of reducing noise, but has an effect of smoothing information of edge part such as a marker.

On the contrary, the bilateral filter increases an applied value of the Gaussian filter by increasing importance weight of pixels which is similar to surrounding brightness, and preserves edge in the opposite case. Accordingly, the bilateral filter is an effective filter which reduces noise while increasing resolution of a corner point such as a marker. An image going through the bilateral filter is converted to a binarization image which is configured with black and white, and then, a blob algorithm is applied to find an area of a marker.

Here, the blob algorithm which is called as blob or blob labeling is an algorithm detecting an area by attaching the same label to a part having the same pixel value as its own pixel.

Candidates of markers may be found by detecting an area having the same label through the blob algorithm, and the candidates may be reduced through calculating wideness of area of the candidates of the markers and limitation that the markers are markers which wideness is within a certain range. Through this process, final markers are detected, and coordinates of corner points of the markers are detected.

Here, the corner points may be in pixels as integer type. For example, a location of one pixel is $q_{1,XP}$=1202, $q_{1,YP}$=171.

Furthermore, to extract more precise coordinates of corner points of the markers, the coordinates of corner points may be estimated with an accuracy of sub-pixel, and the coordinates of corner points of a decimal unit may be $q_{1,XP}$=1202.612, $q_{1,YP}$=170:698 of integer type.

When the feature point (or corner point) of the first marker and the feature point of the second marker which are included in the marker images are extracted through the above described process, 6-DOF relative displacement of the dynamic member for the fixing member is estimated based on the homography estimation method by using the extracted feature point of the first marker and the feature point of the second marker (S230).

In operation S230, when 6-DOF relative displacement of the dynamic member is estimated by using the homography estimation method, final 6-DOF relative displacement of the dynamic member for the fixing member is estimated by using the probability-based location estimation method which inputs the 6-DOF relative displacement estimated by the homography estimation method, for example, MCL method (S240).

In other words, because the estimated final 6-DOF relative displacement of operation S240 is displacement between the fixing member and the dynamic member, 6-DOF displacement between markers which are put on the member is measured. Because 6-DOF displacement of the camera may be obtained based on the two markers, 6-DOF displacement between markers may be measured, and 6-DOF displacement of the member is measured.

When final 6-DOF relative displacement of the dynamic member from each of Subsystem 1 and Subsystem 2 is estimated, the dynamic member is visualized with respect to the fixing member based on the estimated final 6-DOF relative displacement, and the visualized information is displayed on a tablet PC by transporting the visualized data to a user terminal, for example, the tablet PC of a crane operator (S250).

Because distance between a crane operator and a precast member is more than about 20 m away, Bluetooth is used to transport wirelessly 6-DOF displacement information. When 6-DOF information measured in each of Subsystems is transmitted to a main system that the crane operator is located, after the main system receives the measured 6-DOF displacement information of Subsystem 1 and Subsystem 2 and processes the data for visualization, the two 6-DOF displacements measured in a tablet PC may be expressed as a center of a precast member and the dynamic member moved by the crane operator may be visualized by transmitting the processed data to the tablet PC that the crane operator watches visualized screen of member based on TCP/IP.

Although it is described in FIG. 2 that the process estimating 6-DOF displacement of the dynamic member uses sequentially the homography estimation method and the probability-based location estimation method, 6-DOF displacement may be estimated by using only the homography estimation method by considering a situation such as occlusion of a marker, blur of an image, and the like, and 6-DOF displacement may be estimated by using only the probability-based location estimation method such as MCL method. This will be described in detail as below.

Homography Estimation Method

Homography expresses a relation between world coordinate system in which particular object is located and pixel coordinate system in which an image of an object acquired through a camera is projected.

Figure 6:
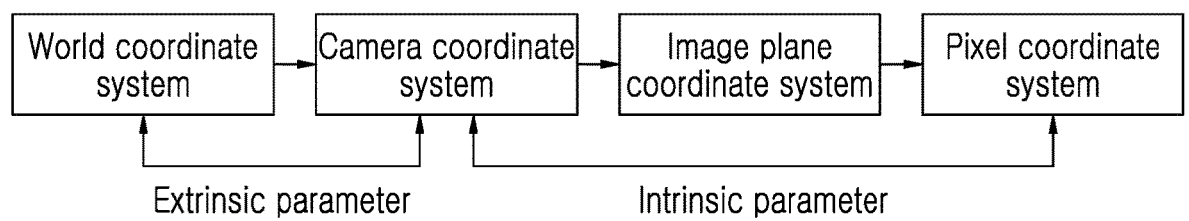
FIG. 6 illustrates an example of an intrinsic parameter and an extrinsic parameter.

FIG. 6 shows a relation of world coordinate system and pixel coordinate system on an image through a camera, and the relation between world coordinate system and coordinate system in which a camera is located is expressed as an extrinsic parameter. Here, the extrinsic parameter is a representation relating to how much movement and rotation occurs based on world coordinate system, and location of the camera and rotation information may be obtained from the extrinsic parameter.

Figure 7:
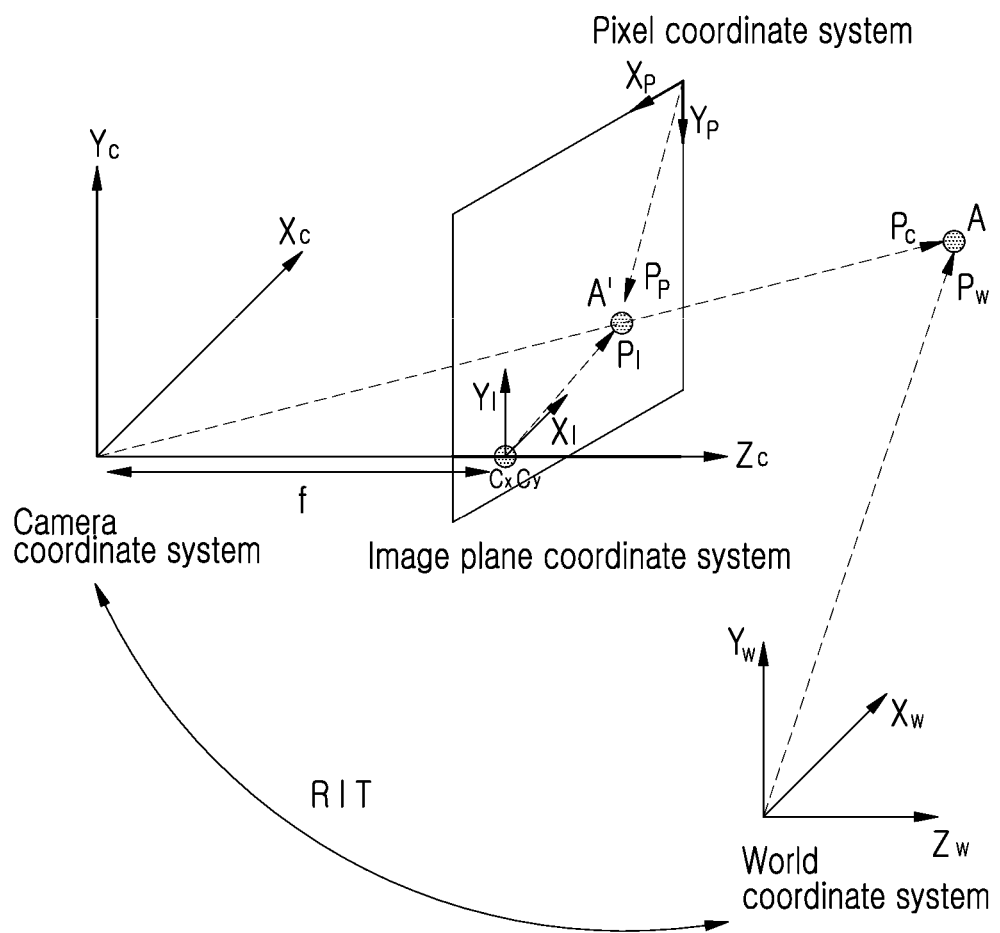
FIG. 7 illustrates an example of a pin-hole camera model.

When an image of an object is acquired through a camera, the acquired image is projected to two-dimensional image plane coordinate system. Then, a coordinate transformation is performed form image plane coordinate system to pixel coordinate system, and an object location is obtained in a pixel unit. A relation between camera coordinate system and pixel coordinate system may be represented as an intrinsic parameter, and the intrinsic parameter relates to unique feature of camera lens. The relation between a camera and an object may be described with a pinhole camera model which is illustrated in FIG. 7.

Pinhole represents that light reflected to a three-dimensional object through a small hole on paper comes and is projected to image plane, and considers only light projected to the image plane by passing the pinhole among light reflected to the three-dimensional light at various angles.

A method calculating a camera intrinsic parameter is as follows. Light reflected to object A is projected as A' in the image plane coordinate and gathered in origin of camera coordinate system. The below [Equation 1] represents a relation when looking at the location of A' from camera coordinate system and when looking at the location of A' from image plane coordinate system.

$$X_I = f \frac{X_C}{Z_C}$$
$$Y_I = f \frac{Y_C}{Z_C}$$
[Equation 1]

Here, $X_I$ and $Y_I$ mean the location of A' in the image plane coordinate system, $X_C$ and $Y_C$ mean the location of A' in the camera coordinate system, and f is focal distance and may mean distance between $Z_C$ direction and image plane from the origin of the camera coordinate system.

The below [Equation 2] and [Equation 3] represent the location of A' on the image plane coordinate system and the location of A' on the pixel coordinate system.

$$X_I = -(X_P - c_x)h_x$$
$$X_P = -\frac{X_I}{h_x} + c_x$$
[Equation 2]

$$Y_I = -(Y_P - c_y)h_y$$
$$Y_P = -\frac{Y_I}{h_y} + c_y$$
[Equation 3]

Here, $X_P$ and $Y_P$ mean the location of A' on the pixel coordinate system, $c_x$ and $c_y$ are principle points and mean points where $Z_C$ direction meets image plane on the camera coordinate system, and $h_x$ and $b_y$ may mean size of pixel of each of directions.

The above Equation 1 is substituted to the above Equations 2 and 3, and converted to matrix form. Then, the below [Equation 4] may be represented. Here, if pixel which is supposed to be square in producing process is tilted, the tilt is considered, and $s_{skew}$ represents an incline of a pixel, and the final form is as below.

$$\begin{bmatrix} X_P \\ Y_P \\ 1 \end{bmatrix} = \begin{bmatrix} -\frac{f}{h_x} & s_{skew} & c_x \\ 0 & -\frac{f}{h_y} & c_y \\ 0 & 0 & 1 \end{bmatrix} \begin{bmatrix} X_C \\ Y_C \\ Z_C \end{bmatrix}$$
[Equation 4]

A relation between the camera coordinate system ($P_C$) and the pixel coordinate system ($P_P$) may be represented as below [Equation 5].

$$P_P = M_{in} P_C$$
[Equation 5]

Here, $M_{in}$ may mean an intrinsic parameter.

An extrinsic parameter represents a relation between the world coordinate system and the camera coordinate system, and may be represented as below [Equation 6].

$$\begin{bmatrix} X_C \\ Y_C \\ Z_C \end{bmatrix} = \begin{bmatrix} r_{11} & r_{12} & r_{13} \\ r_{21} & r_{22} & r_{23} \\ r_{31} & r_{32} & r_{33} \end{bmatrix} \begin{bmatrix} X_W - T_X \\ Y_W - T_Y \\ Z_W - T_Z \end{bmatrix}$$
[Equation 6]

The location of A may be represented as $X_W$, $Y_W$, $Z_W$ on the world coordinate system and $X_C$, $Y_C$, $Z_C$ on the camera coordinate system, and r and T mean rotational and linear movement of the camera coordinate system for the world coordinate system.

If the above Equation 6 is simplified, the below [Equation 7] may be represented, and what each of variables means may be represented as below [Equation 8].

$$P_C = R(P_W - T)$$
[Equation 7]

$$P_C = \begin{bmatrix} X_C \\ Y_C \\ Z_C \end{bmatrix}$$

$$R = \begin{bmatrix} r_{11} & r_{12} & r_{13} \\ r_{21} & r_{22} & r_{23} \\ r_{31} & r_{32} & r_{33} \end{bmatrix}$$

$$PW = \begin{bmatrix} X_W \\ Y_W \\ Z_W \end{bmatrix}$$

$$T = \begin{bmatrix} T_X \\ T_Y \\ T_Z \end{bmatrix}$$
[Equation 8]

The below [Equation 9] is a modified form of the above Equation 6, and $R_k^{Tr}$ (k=1, 2, 3) may mean each of columns among elements of r.

$$X_C = R_1^{Tr}(P_W - T)$$
$$Y_C = R_2^{Tr}(P_W - T)$$
$$Z_C = R_3^{Tr}(P_W - T)$$
[Equation 9]

Because the above Equation 9 is a non-homogeneous matrix, it needs to be converted to a homogeneous matrix. The form converted from the non-homogeneous matrix to the homogeneous matrix may be represented as below [Equation 10]. Accordingly, a relation between the world coordinate system ($P_W$) and the camera coordinate system may be represented as below [Equation 11].

$$\begin{bmatrix} X_C \\ Y_C \\ Z_C \end{bmatrix} = \begin{bmatrix} r_{11} & r_{12} & r_{13} & -R_1^{Tr}T \\ r_{21} & r_{22} & r_{23} & -R_2^{Tr}T \\ r_{31} & r_{32} & r_{33} & -R_3^{Tr}T \end{bmatrix} \begin{bmatrix} X_W \\ Y_W \\ Z_W \end{bmatrix}$$
[Equation 10]

$$P_C = M_{ex} P_W$$
[Equation 11]

Here, $M_{ex}$ is an extrinsic parameter, and the camera coordinate may be represented as multiplication of the extrinsic parameter and the world coordinate parameter.

If it is expressed from the world coordinate system to the pixel coordinate system as a form of a matrix, the below [Equation 12] may be represented.

$$\begin{bmatrix} X_P \\ Y_P \\ Z_P \end{bmatrix} = \begin{bmatrix} -\frac{f}{h_x} & s_{skew} & c_x \\ 0 & -\frac{f}{h_y} & c_y \\ 0 & 0 & 1 \end{bmatrix} \begin{bmatrix} r_{11} & r_{12} & r_{13} & -R_1^{Tr}T \\ r_{21} & r_{22} & r_{23} & -R_2^{Tr}T \\ r_{31} & r_{32} & r_{33} & -R_3^{Tr}T \end{bmatrix} \begin{bmatrix} X_W \\ Y_W \\ Z_W \end{bmatrix}$$
[Equation 12]

In other words, the above Equation 12 may be expressed as a multiplication of the intrinsic parameter expressing the camera coordinate system and the pixel coordinate system and the extrinsic parameter expressing the relation between the world coordinate system and the camera coordinate system, and it may be represented as below [Equation 13].

$$P_P = M_{in} M_{ex} P_W \qquad \text{[Equation 13]}$$

Figure 8:
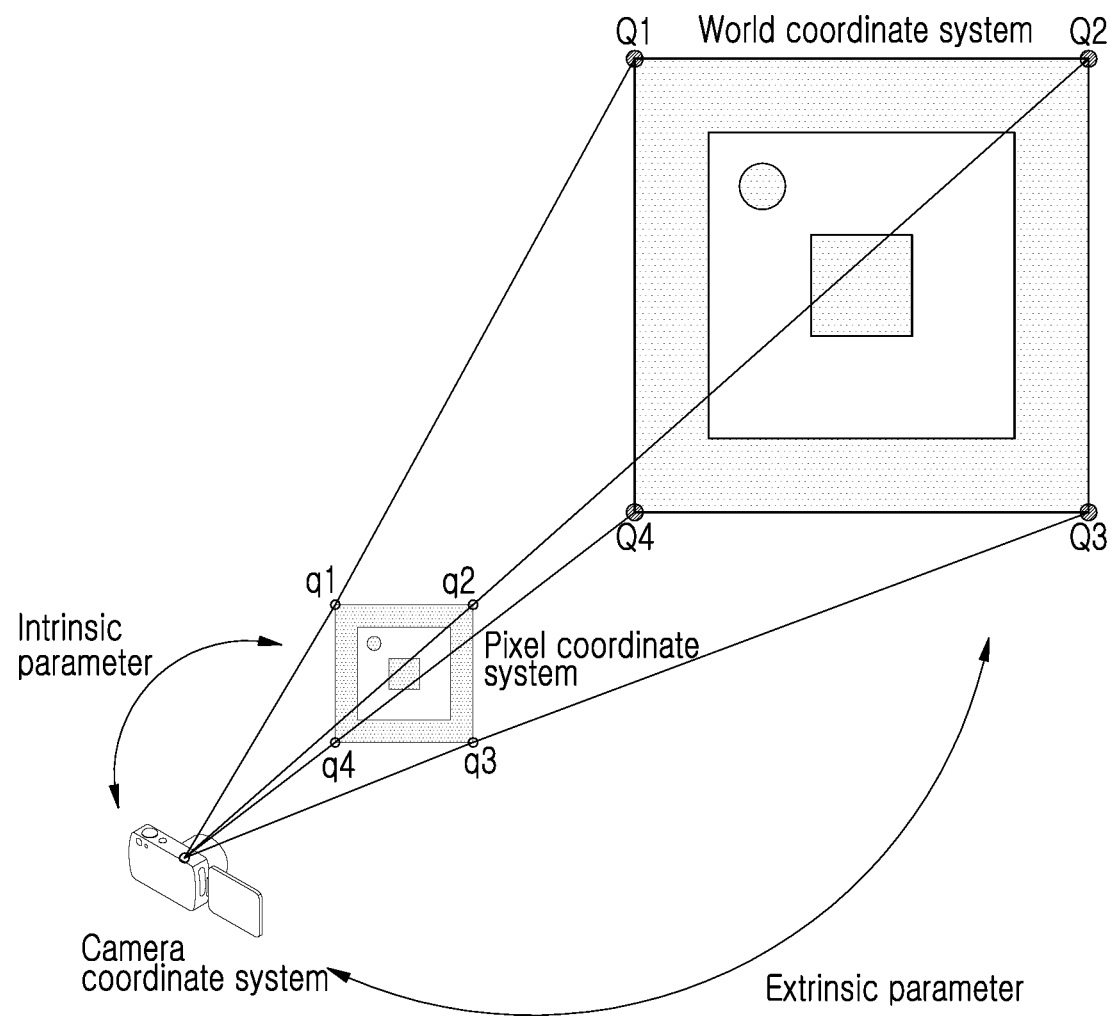
FIG. 8 illustrates an example of a relation between a camera and a marker.

FIG. 8 illustrates an example of a relation between a camera and a marker, and represents a relation between a marker and a camera which are used based on homography.

Figure 9:
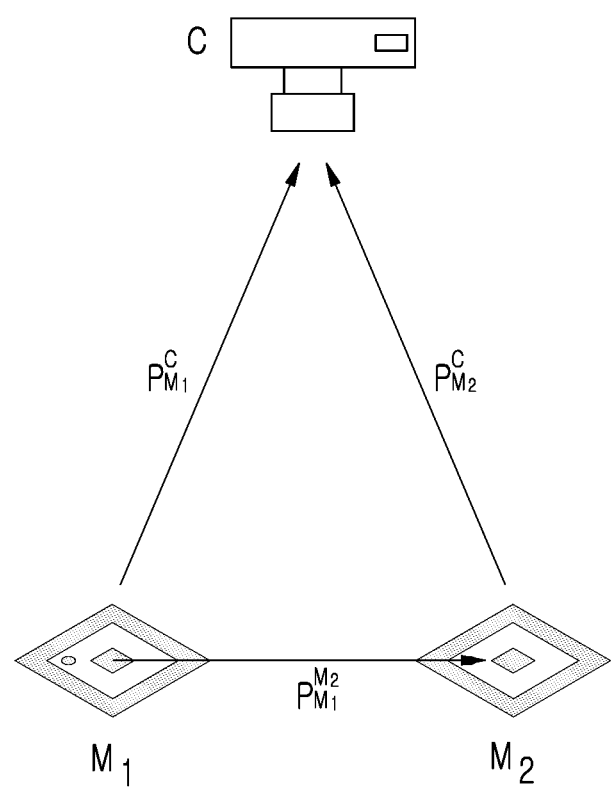
FIG. 9 illustrates an example of a process estimating location of dynamic member from multiple markers.

As illustrated in FIG. 8, a corner point of a marker is projected to pixel coordinate system of a camera, and a relation of the camera and the pixel coordinate system may be expressed as an intrinsic parameter, a relation between the camera and world coordinate system may be expressed as an extrinsic parameter indicating linear movement and rotation movement. As illustrated in FIG. 9, 6-DOF between a marker and a marker may be estimated by extending 6-DOF estimation between one camera and a marker. In other words, as described in below [Equation 14], after estimating a location of a camera based on one marker, the location of the camera is estimated based on another marker and takes and multiplies an inverse matrix, and then, 6-DOF between the marker and the marker may be estimated.

$$P_{M_1}^{M_2} = P_{M_1}^{C} (P_{M_2}^{C})^{-1} \qquad \text{[Equation 14]}$$

In other words, after 6-DOF relative displacement between a camera and a first marker is estimated by using a corner point (or feature point) extracted for the first marker attached to a fixing member and 6-DOF relative displacement between the camera and a second marker is estimated by using a corner point of the second marker attached to a dynamic member, 6-DOF relative displacement of the dynamic member for the fixing member may be estimated based on the 6-DOF relative displacement between the camera and the first marker and the 6-DOF relative displacement between the camera and the second marker.

Monte Carlo Localization Method

1) Bayesian Filter

MCL (Monte Carlo Localization) method is a method estimating a location of a robot based on probability when the robot is placed in any environment, and probabilistic location of the robot is called as posterior probability, which represented as below [Equation 15].

$$bel(x_t) = p(x_t | z_1 \ldots t, u_1 \ldots t) \qquad \text{[Equation 15]}$$

Here, t means time, $x_t$ means a location of the robot, and $z_1 \ldots t$ means ultrasonic waves up to time t and means data acquired from external environment around the robot by using a laser sensor and the like, $u_1 \ldots t$ means moving data of the robot up to time t, and the data may be acquired by usually using an encoder.

The whole process of Bayesian filter may be separated into two ways, prediction process and update process. In the prediction process, it is a process predicting how much the robot is moved from motion model of the robot with motion information acquired from an encoder of the robot. The prediction process may be represented as below [Equation 16] and [Equation 17].

$$bel^-(x_t) = p(x_t | z_1 \ldots t-1, u_1 \ldots t) \qquad \text{[Equation 16]}$$

$$bel^-(x_t) = \int p(x_t | u_t, x_{t-1}) bel(x_{t-1}) dx_{t-1} \qquad \text{[Equation 17]}$$

Then, the location of the robot for the external environment is updated from ultrasonic waves or laser sensor data attached to the robot. $bel^-(x_t)$ information of the prediction process makes the location of the robot more precise with data measure by using a sensor in update process indicated in below [Equation 18].

$$bel(x_t) = \eta p(z_t | x_t) bel^-(x_t) \qquad \text{[Equation 18]}$$

Here, $\eta$ is for normalization, and may mean constant value which allows the sum of location estimation probability value of the robot to be 1.

2) Particle Filter

A location is estimated based on probability by representing a location of a robot as particles in MCL method. Steps of MCL are divided into sampling, importance weight operation, and resampling processes.

The sampling process generates a set of particles based on a motion model of the robot. The importance weight operation process gives high importance weight to a particle indicating more precise location of the robot by determining how much each of particles indicates precise location of the robot through comparison of data measured from a robot sensor. The resampling process is a process to allow the set of particles to estimate a more precise location of the robot by discarding particles having less importance weight in the previously generated set of particles and generating new particles based on particles having high importance weight.

Figure 10:
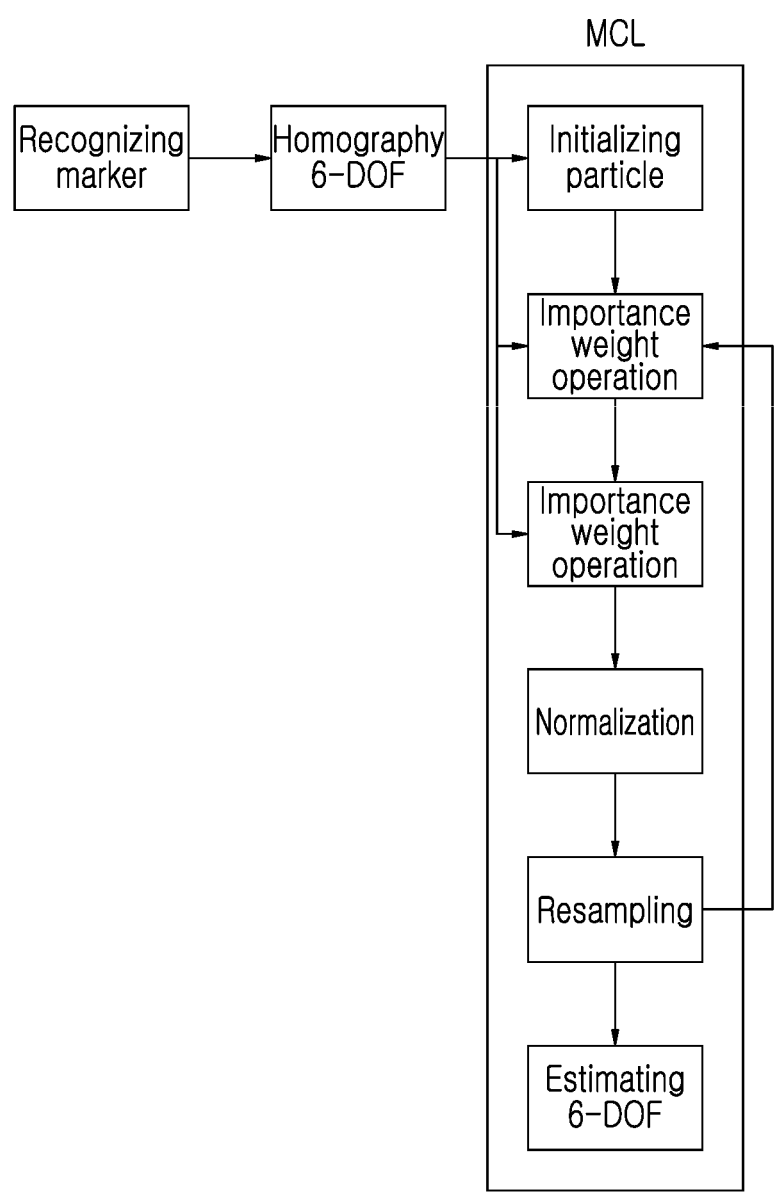
FIG. 10 is an operation flow chart illustrating MCL (Monte Carlo localization) method.

MCL of the present invention estimates probabilistic 6-DOF displacement when there is a phenomenon such as blur of a marker, and implementation process of MCL is FIG. 10.

Referring to FIG. 10, to describe implementation process of MCL, particles have 6-DOF, and particles are initialized based on 6-DOF calculated by homography which is acquired after recognizing marker. Particles are sampled by applying change amount of 6-DOF to particle, and importance weight is determined by calculating importance weight of each of sampled particles and normalizing the sum of the importance weights to be 1.

Here, when $N_{eff}$ is lower than $\eta_{eff}$, particles may be newly generated based on particles having high importance weights, and final 6-DOF may be calculated (or estimated) based on average of particles having top importance weights.

A process of MCL algorithm is as below Algorithm 1.

---

Algorithm 1 MCL algorithm

---

1: function MCL ($h^t$)
2:   if t = 0 then
3:     for n = 1 to N do
4:       $x_n^{(0)} = h^{(0)}$ + normal distributed rand( ); ▷Particle initialization
5:       $w_n^{(0)} = 1/N$;
6:     end for
7:   else
8:     for n = 1 to N do
9:       $\Delta h^{(t)} = h^{(t)} - h^{(t-1)}$;
10:      $x_n^{(t)} = x_n^{(t-1)} + \Delta h^{(t)}$; ▷Sampling
11:      for z = 1 to $N_C$ do
12:        $dist_{M_n}[n]$ = euclidean dist of $r_{M_n}[z] - e_{M_n}[z]$;
13:        total $dist_{M_n}$ = total $dist_{M_n}$ + $dist_{M_n}[z]$;

-continued

Algorithm 1 MCL algorithm

14:     end for
15:     average dist$_{M_n}$ = total dist$_{M_n}$ + dist$_{M_n}$/N$_C$; ▷Calculating score value
16:     w$_n^{(t)}$ = ∝ exp(−(average dist$_{M_n}$)$^2$/2σ$^2$)/√2πσ$^2$; ▷Importance weight 17:     $\hat{w}_n^{(t)} = \dfrac{w_n^{(t)}}{\sum_{k=1}^{N} w_n^{(k)}}$;

▷Normalization

18:     end for

19:     $N_{\mathit{eff}} = \left[ \sum_{k=1}^{N} (\hat{w}_k^{(t)})^2 \right]^{-1}$ 20:     if N$_{\mathit{eff}}$ ≤ η$_{\mathit{eff}}$ then 21:         for j = 1 to $\dfrac{N - N_R}{N_R}$ do 22:             for k = N$_R$ to 2N$_R$ do
23:                 x$_{j+k}^{(t)}$ = x$_j^{(t)}$ + normal distributed rand ( ); ▷Resampling
24:             end for
25:         end for
26:         for n = 1 to N do
27:             w$_n^{(t)}$ = 1/N; ▷Initializing weight
28:         end for
29:     end if
30: end if
31: P$_M^{(t)}$ is calculated from average of NR particles. ▷6-DOF displacement based on MCL
32: return P$_M^{(t)}$
33: end function MCL algorithm starts when a marker is recognized and entered as 6-DOF initial value which is calculated with homography, and generates initial particles by randomly generating a value having normalization distribution which is a form of random at the initial 6-DOF value calculated with homography.

Here, a general formula may be indicated as below [Equation 19].

$$h^{(t)} = [x_G^{(t)}, y_G^{(t)}, z_G^{(t)}, \theta_G^{(t)}, \phi_G^{(t)}, \psi_G^{(t)}]$$

$$x_n^{(t)} = [x_{M,n}^{(t)}, y_{M,n}^{(t)}, z_{M,n}^{(t)}, \theta_{M,n}^{(t)}, \phi_{M,n}^{(t)}, \psi_{M,n}^{(t)}] \quad \text{[Equation 19]}$$

Here, t means time, h(t) means 6-DOF set obtained through homography operation, $x_n^{(t)}$ means particles, and the particles may mean a set having 6-DOF estimated with probability.

Sampling means generating particles by considering motion model, and in case of a robot, the motion model is configured based on how much movement is performed by measuring with a sensor such as an encoder of a wheel. In the present invention, difference between 6-DOF of previous time may be configured as the motion model.

It is necessary to determine how precise 6-DOF that each of particles has is, and this may be known by calculating importance weight.

FIG. 11 which illustrates an example of comparison according to image blur compares between image when blur occurs and image when no blur occurs. As illustrated in FIG. 11A, when no blur occurs, corner points of a marker of binarized image is at right angle, but corner points of an image where Gaussian noise is applied are rounded and difficult to find precise corner points. Also, as illustrated in FIG. 11B, 6-DOF calculated with homography from corner points of a marker extracted from an image where blur occurs has a lot of errors.

Importance weight operation may calculate importance weight by not having the corner point information as a standard of importance weight operation but using distance difference between pixel point of each edge of a marker and pixel point of each edge calculated from corner point that particle has.

Figure 12:
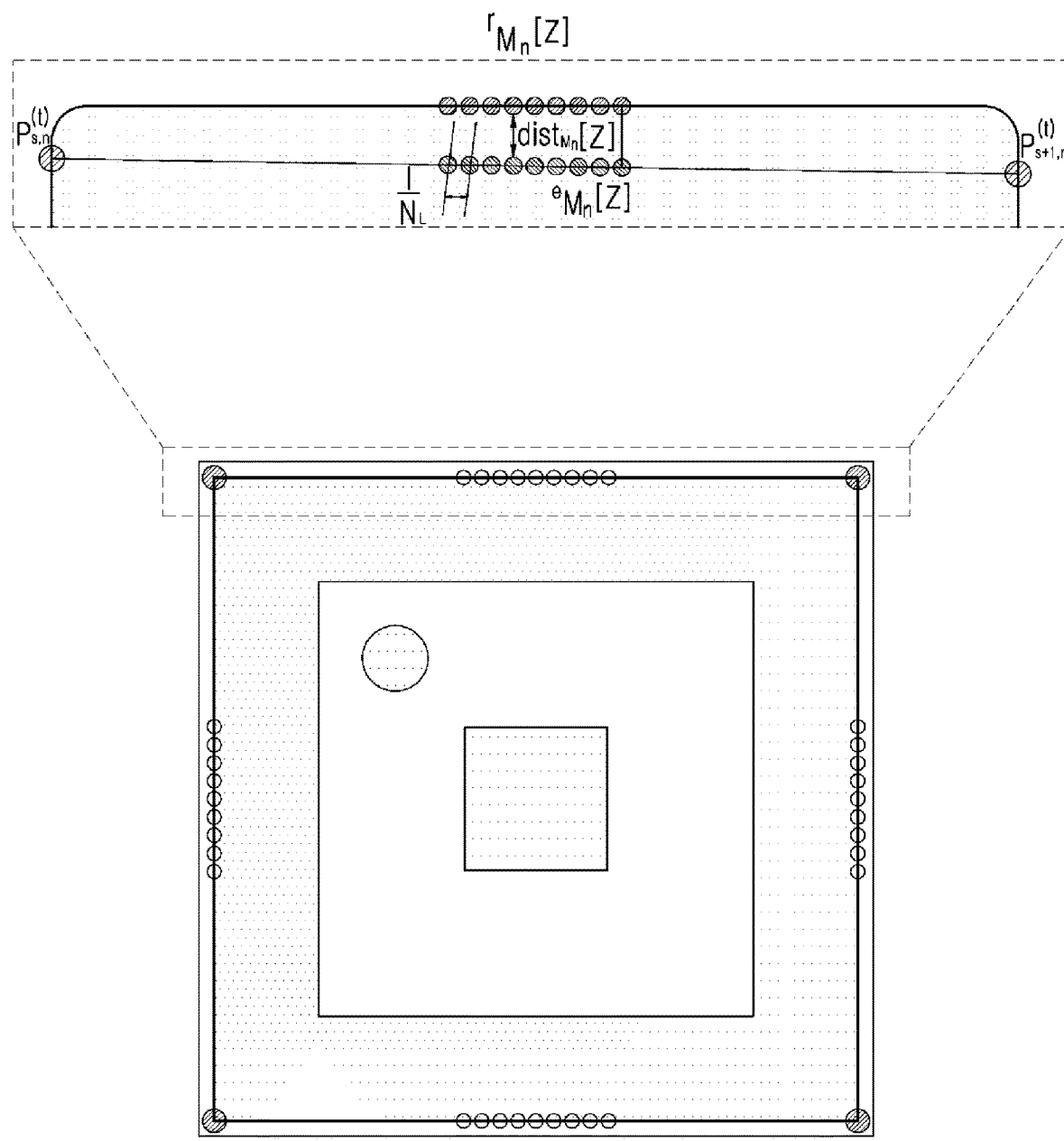
FIG. 12 illustrates an example of a relation between particle and pixel point of one edge of marker.

FIG. 12 which expresses the above contents with a part of one edge of a marker illustrates an example of a relation between particle and pixel point of one edge of marker.

In FIG. 12, $p_{s,n}^{(t)}$, $p_{s+1,n}^{(t)}$ is corner points obtained from 6-DOF of particles, and from this, linear equation is calculated and points are calculated at intervals of 1/N$_L$ on the line.

Here, l means length of $p_{s,n}^{(t)}$ and $p_{s+1,n}^{(t)}$, N$_L$ means the maximum number of points existing on one edge of a marker, and N$_C$ may mean the total number of points of a marker part. Points at intervals of 1/N$_L$ are expressed as $e_{Mn}[z]$, and z is 1, 2, . . . , N$_C$. A line which is vertical to a line obtained with $p_{s,n}^{(t)}$ and $p_{s+1,n}^{(t)}$ is obtained, and a point where the vertical line and a marker edge meets is $r_{Mn}[z]$.

As dist[z] of Algorithm 1, dist$_{Mn}$[z] is calculated with difference between $r_{Mn}[z]$ and $e_{Mn}[z]$, average distance is calculated by adding total N$_C$ number of dist$_{Mn}$[z], and with this average distance, importance weight having Gaussian normalization distribution is calculated.

The normalization process makes the sum of all importance weights calculated in the importance weight operation to be 1. Resampling process newly generates particles based on particles having high importance weights when N$_{\mathit{eff}}$ is smaller than η$_{\mathit{eff}}$. N$_R$ particles having high importance weights are selected, and N particles are regenerated by making to have a value randomly generating a value giving randomized normalization distribution to the corresponding particles, and then, importance weight is initialized.

3) Hybrid

When a part of a marker is invisible, a location may be estimated by using MCL method. When only a part of a marker is visible, if $dist_{Mn}[z]$ may be calculated through a relation between edge where a part of the marker is visible and linear equation from a corner point of the marker which is derived from 6-DOF that particle has, because importance weight may be calculated, final 6-DOF may be calculated. Accordingly, when a marker is invisible because a part of the marker is covered, it is hybridized to use MCL method.

FIG. 13 illustrates an example of change of surrounding pixel according to blur, and as illustrated in FIG. 13A, when no blur occurs, it is possible to precisely estimate a corner point of a marker because black and white surrounding boundary rapidly increases. However, as illustrated in FIG. 13B, when blur occurs, because it is difficult to precisely estimate an apex of a marker, there are alot of errors if 6-DOF is calculated by calculating a corner point for homography operation.

To solve this, the present invention estimates 6-DOF based on probability when blur occurs with MCL method. A method hybridizing and using homography operation and MCL operation is described as follows.

Figure 14:
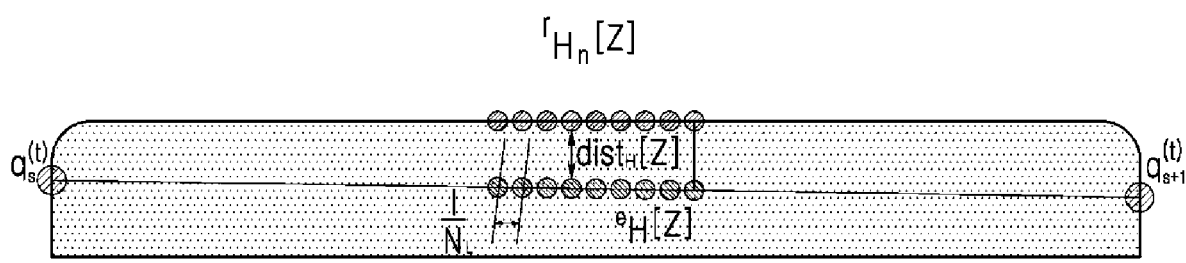
FIG. 14 illustrates an example of a relation between corner point of marker used on homography operation and pixel point of one edge of marker.

FIG. 14 illustrates an example of a relation between corner point of a marker used on homography operation and pixel point of one edge of the marker, as illustrated in FIG. 14, average (average $dist_H$) of a corner point of a marker used for homography operation is obtained from distance difference ($dist_H[z]$) between pixel point ($e_H[z]$) on linear equation inferred from a corner point of a marker ($q_s^{(t)}$) in importance weight operation on MCL process and each edge of the marker, and a method that distance difference is small by comparing this value with average of distance difference (average $dist_{M1}$) that particle having the largest importance weight of MCL has, and final 6-DOF ($P_F^{(t)}$) is estimated.

Hybrid algorithm process is as below Algorithm 2.

| Algorithm 2 Hybrid algorithm |
| --- |
| 1: function HYBRID(bDetected,average $dist_{M1}$, $q_s^{(t)}$, $P_H^{(t)}$, $P_M^{(t)}$) |
| 2:    for z = 1 to $N_C$ do |
| 3:       $dist_H[z]$ = euclidean dist of $r_H[z]-e_H[z]$; |
| 4:       total $dist_H$ = total $dist_H$ + $dist_H[z]$; |
| 5:    end for |
| 6:    average $dist_H$ = total $dist_H$ / $N_C$; |
| 7:    if bDetected==true then |
| 8:       if average $dist_{M1}$ ≥ average $dist_H$ then |
| 9:          $P_F^{(t)}$ = $P_H^{(t)}$; |
| 10:      else |
| 11:          $P_F^{(t)}$ = $P_M^{(t)}$; |
| 12:      end if |
| 13:    else |
| 14:       $P_F^{(t)}$ = $P_M^{(t)}$; |
| 15:    end if |
| 16:    return $P_F^{(t)}$ |
| 17: end function |

As described in Algorithm 2, a hybrid algorithm calculates average (average $dist_H$) of a corner point of a marker used for homography operation from distance difference ($dist_H[z]$) between pixel point ($e_H[z]$) on linear equation inferred from corner point of a marker ($q_s^{(t)}$) in importance weight operation on MCL process and each edge of the marker, and when there is no occlusion of a marker (bDetected) or blur occurs, the calculated average (average $dist_H$) and average of distance difference (average $dist_{M1}$) that particle having the largest importance weight of MCL has are compared. Then, when the average (average $dist_{M1}$) is above the average (average $dist_H$), homography estimation method is selected, and 6-DOF ($P_H^{(t)}$) estimated by homography estimation method is determined as final 6-DOF ($P_F^{(t)}$), and when the average (average $dist_{M1}$) is below the average (average $dist_H$), MCL method is selected, and 6-DOF ($P_M^{(t)}$) estimated by MCL method is determined as final 6-DOF ($P_F^{(t)}$).

Also, when partially occlusion occurs to a marker, MCL method is selected, and then, 6-DOF estimated by MCL method is determined as final 6-DOF.

Likewise, according to example embodiments of the present invention, the method extracts feature points, for example, corner points of two markers by image processing marker images for a marker (first marker) of a fixing member and a marker (second marker) of a dynamic member by considering whether there is blur or not, whether there is occlusion of a marker or not, and the like, estimates 6-DOF for the dynamic member by using the extracted feature points and homography estimation method or probability-based estimation method, and precisely estimates a relative location of the dynamic member for the fixing member when there is occlusion of a marker by the dynamic member or there is blur on a camera image by member moving.

In other words, as described above, the present invention may reduce estimation errors for 6-DOF relative displacement of the member by estimating final 6-DOF relative displacement of the dynamic member for the fixing member by sequentially using homography estimation method and probability-based estimation method.

Also, according to example embodiments of the present invention, the method may reduce estimation errors for 6-DOF relative displacement of the member by estimating 6-DOF relative displacement of the dynamic member by using fusing method or hybrid method that uses selectively at least one among homography estimation method and probability-based estimation method, for example, MCL method depending on whether there is occlusion of a marker or blur.

In other words, according to example embodiments of the present invention, the method determines whether image blur occurs, and may estimate 6-DOF relative displacement of the dynamic member by selecting any one among homography estimation method and probability-based estimation method based on importance weight operation of probability-based estimation method when image blur occurs.

FIG. 15 illustrates an example of linear motion and rotational motion of dynamic member, and when a member where a camera jig is put is moved to motion-stage, it is moved to absolute position −25 mm, −15 mm, −5 mm, and 0 mm in X-axis direction on linear motion (a), and rotated −1 degree angle, −2 degree angle, and −3 degree angle to Z-axis direction on rotational motion (b).

Figure 16:
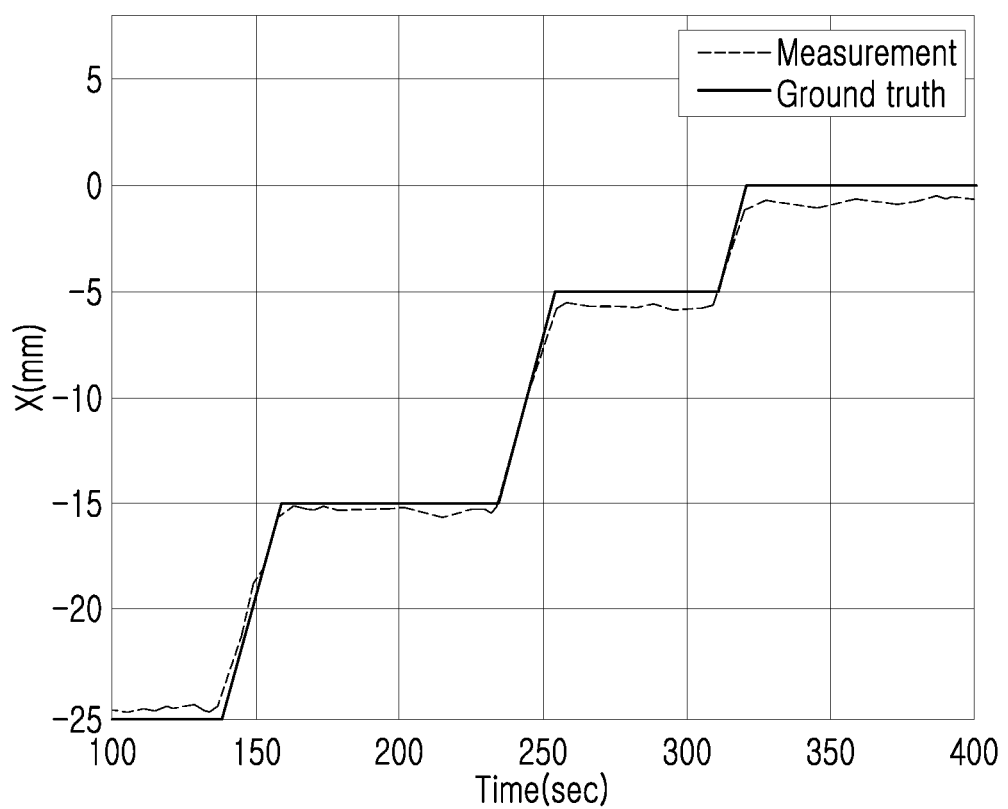
FIG. 16 illustrates an example of a linear motion result graph when there is no blur.
Figure 17:
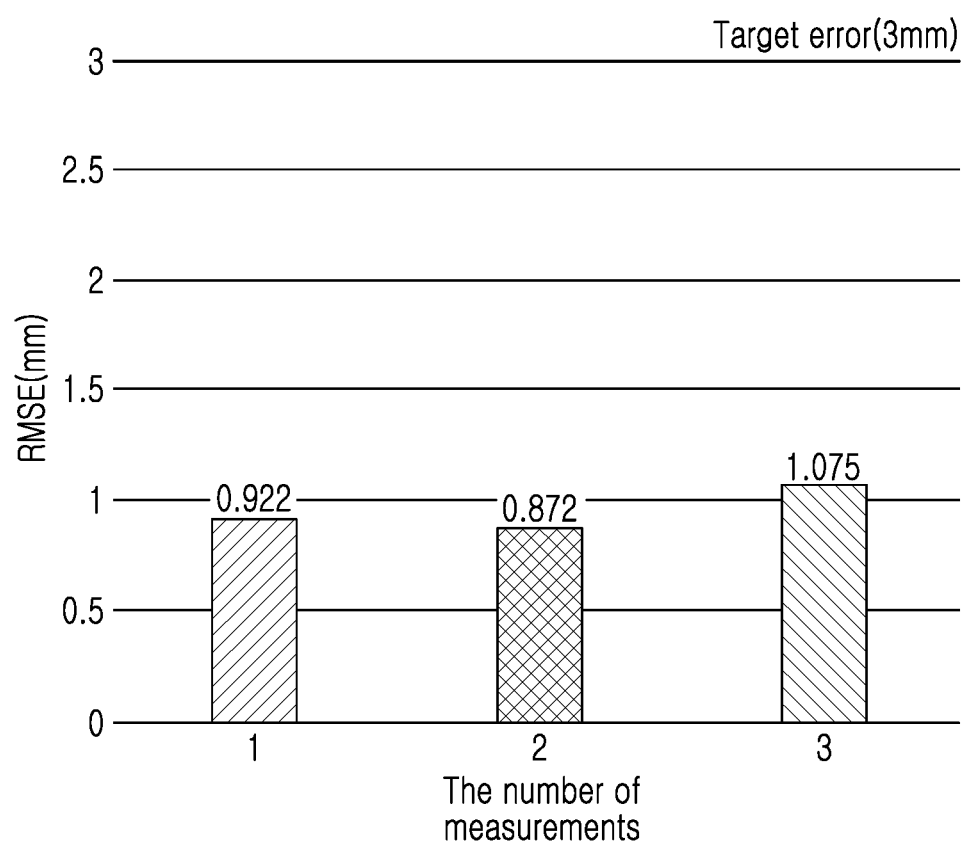
FIG. 17 illustrates an example of a RMSE graph on linear motion when there is no blur.
Figure 18:
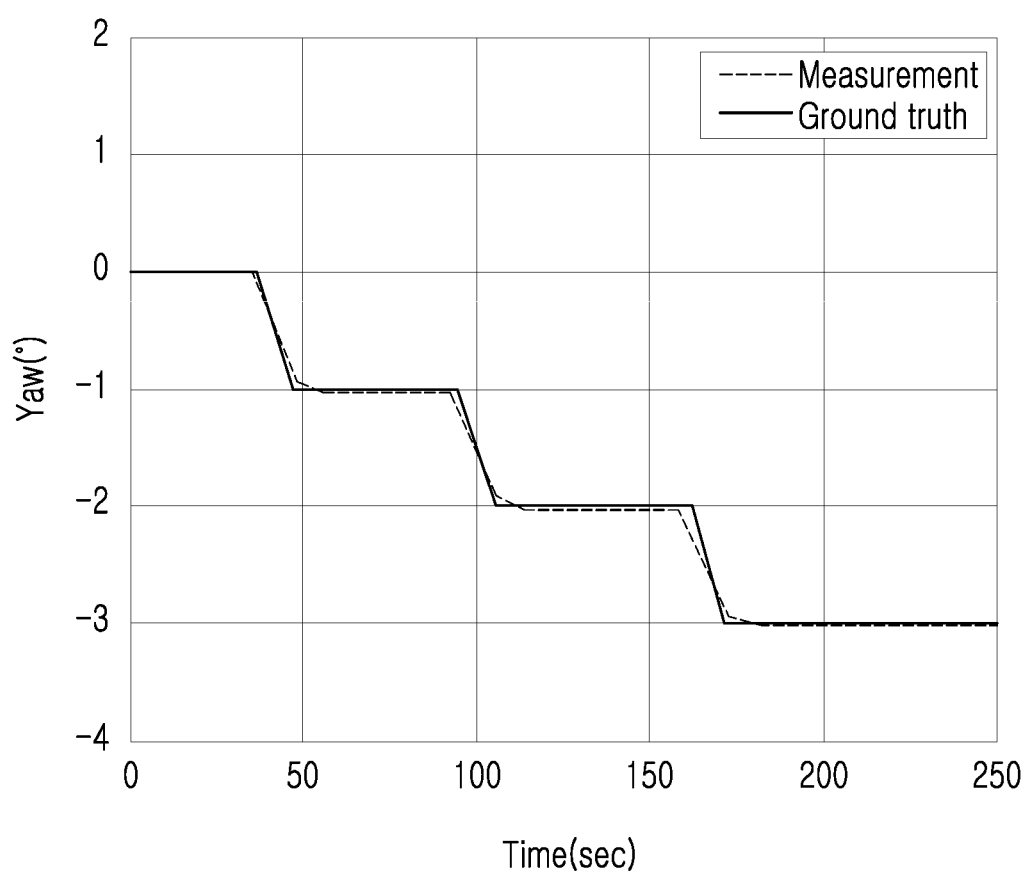
FIG. 18 illustrates an example of a rotational motion result graph when there is no blur.
Figure 19:
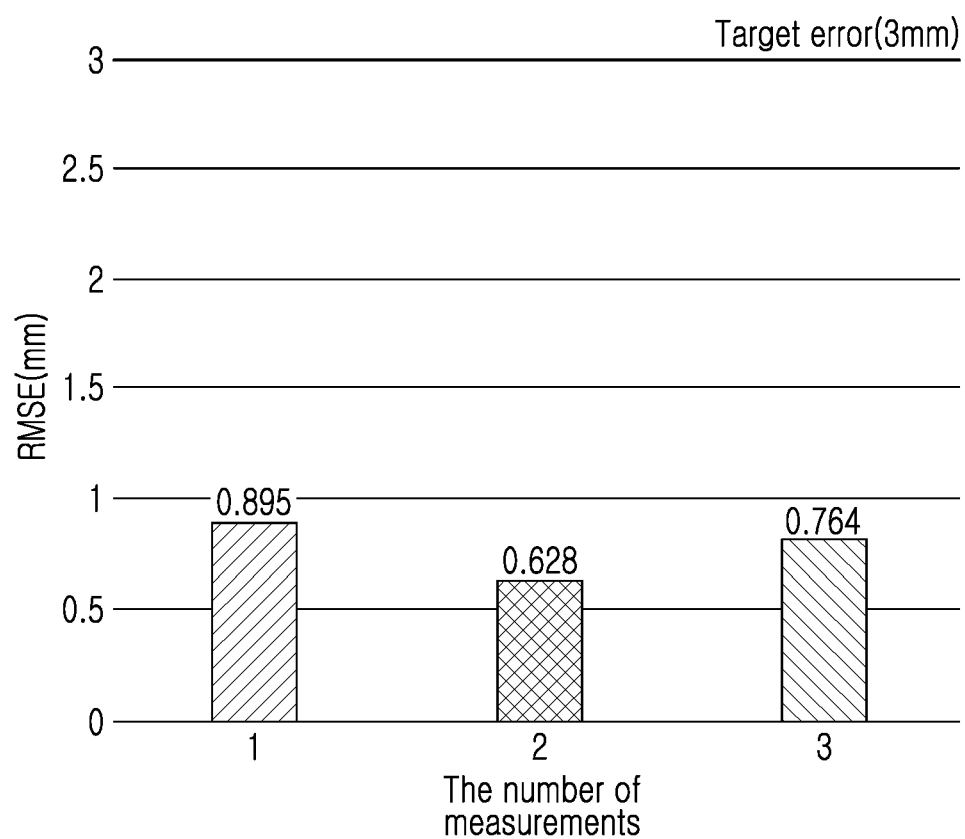
FIG. 19 illustrates an example of a RMSE graph on rotational motion when there is no blur.

FIG. 16 illustrates an example of a linear motion result when there is no blur, FIG. 17 illustrates an example of a RMSE (Root Mean Square Error) graph on linear motion when there is no blur and indicates result of linear motion of FIG. 15, FIG. 18 illustrates an example of a rotational motion result when there is no blur, and FIG. 19 illustrates an example of a RMSE graph on rotational motion when there is no blur.

Each experiment is conducted three times, and maximum RMSE is determined based on error at 0 mm on linear motion and at −3 degree angle on rotational motion. The below Table 1 and Table 2 indicates RMSE by the number of linear motion experiments and the number of rotational motion experiments, and as shown in Table 1 and Table 2, maximum RMSE is 1.075 mm on linear motion, and maximum RMSE is 0.895 mm on rotational motion. Target error 3 mm is linear error targeting at real site when assembling precast member, and regarding this, it may be known that performance is satisfactory.

TABLE 1

| Iteration | Dis.(mm) | X(mm) | Y(mm) | Z(mm) | Linear Av.(mm) | Roll (°) | Pitch(°) | Yaw(°) | Angular Av.(°) |
|---|---|---|---|---|---|---|---|---|---|
| 1 | −25 | 0.301 | 0.518 | 0.400 | 0.721 | 0.036 | 0.028 | 0.023 | 0.029 |
|   | −15 | 0.345 | 0.424 | 0.183 | 0.576 | 0.013 | 0.028 | 0.047 | 0.029 |
|   | −5  | 0.755 | 0.354 | 0.123 | 0.844 | 0.016 | 0.053 | 0.067 | 0.045 |
|   | 0   | 0.865 | 0.300 | 0.106 | 0.922 | 0.062 | 0.065 | 0.123 | 0.083 |
| 2 | −25 | 0.180 | 0.303 | 0.211 | 0.410 | 0.019 | 0.017 | 0.008 | 0.015 |
|   | −15 | 0.468 | 0.500 | 0.086 | 0.690 | 0.048 | 0.035 | 0.020 | 0.034 |
|   | −5  | 0.507 | 0.672 | 0.113 | 0.849 | 0.081 | 0.035 | 0.051 | 0.056 |
|   | 0   | 0.704 | 0.494 | 0.144 | 0.872 | 0.102 | 0.044 | 0.095 | 0.080 |
| 3 | −25 | 0.330 | 0.301 | 0.210 | 0.494 | 0.022 | 0.255 | 0.009 | 0.019 |
|   | −15 | 0.163 | 0.795 | 0.320 | 0.872 | 0.081 | 0.010 | 0.047 | 0.046 |
|   | −5  | 0.599 | 0.662 | 0.609 | 1.086 | 0.085 | 0.045 | 0.075 | 0.069 |
|   | 0   | 0.675 | 0.521 | 0.658 | 1.075 | 0.113 | 0.048 | 0.130 | 0.097 |

TABLE 2

| Iteration | Angle(°) | X(mm) | Y(mm) | Z(mm) | Linear Av.(mm) | Roll(°) | Pitch(°) | Yaw(°) | Angular Av.(°) |
|---|---|---|---|---|---|---|---|---|---|
| 1 | 0  | 0.154 | 0.435 | 0.132 | 0.479 | 0.034 | 0.012 | 0.002 | 0.016 |
|   | −1 | 0.287 | 0.651 | 0.243 | 0.752 | 0.050 | 0.051 | 0.013 | 0.038 |
|   | −2 | 0.269 | 0.528 | 0.299 | 0.664 | 0.045 | 0.065 | 0.014 | 0.041 |
|   | −3 | 0.348 | 0.801 | 0.194 | 0.895 | 0.063 | 0.071 | 0.015 | 0.050 |
| 2 | 0  | 0.059 | 0.204 | 0.103 | 0.236 | 0.015 | 0.005 | 0.002 | 0.007 |
|   | −1 | 0.142 | 0.164 | 0.337 | 0.401 | 0.014 | 0.042 | 0.011 | 0.022 |
|   | −2 | 0.587 | 0.148 | 0.720 | 0.941 | 0.007 | 0.095 | 0.012 | 0.038 |
|   | −3 | 0.471 | 0.087 | 0.406 | 0.628 | 0.006 | 0.083 | 0.005 | 0.031 |
| 3 | 0  | 0.427 | 0.283 | 0.208 | 0.553 | 0.025 | 0.038 | 0.004 | 0.022 |
|   | −1 | 0.057 | 0.260 | 0.220 | 0.345 | 0.021 | 0.038 | 0.018 | 0.025 |
|   | −2 | 0.122 | 0.085 | 0.623 | 0.640 | 0.006 | 0.071 | 0.022 | 0.033 |
|   | −3 | 0.714 | 0.221 | 0.163 | 0.764 | 0.018 | 0.047 | 0.011 | 0.025 |

Figure 20:
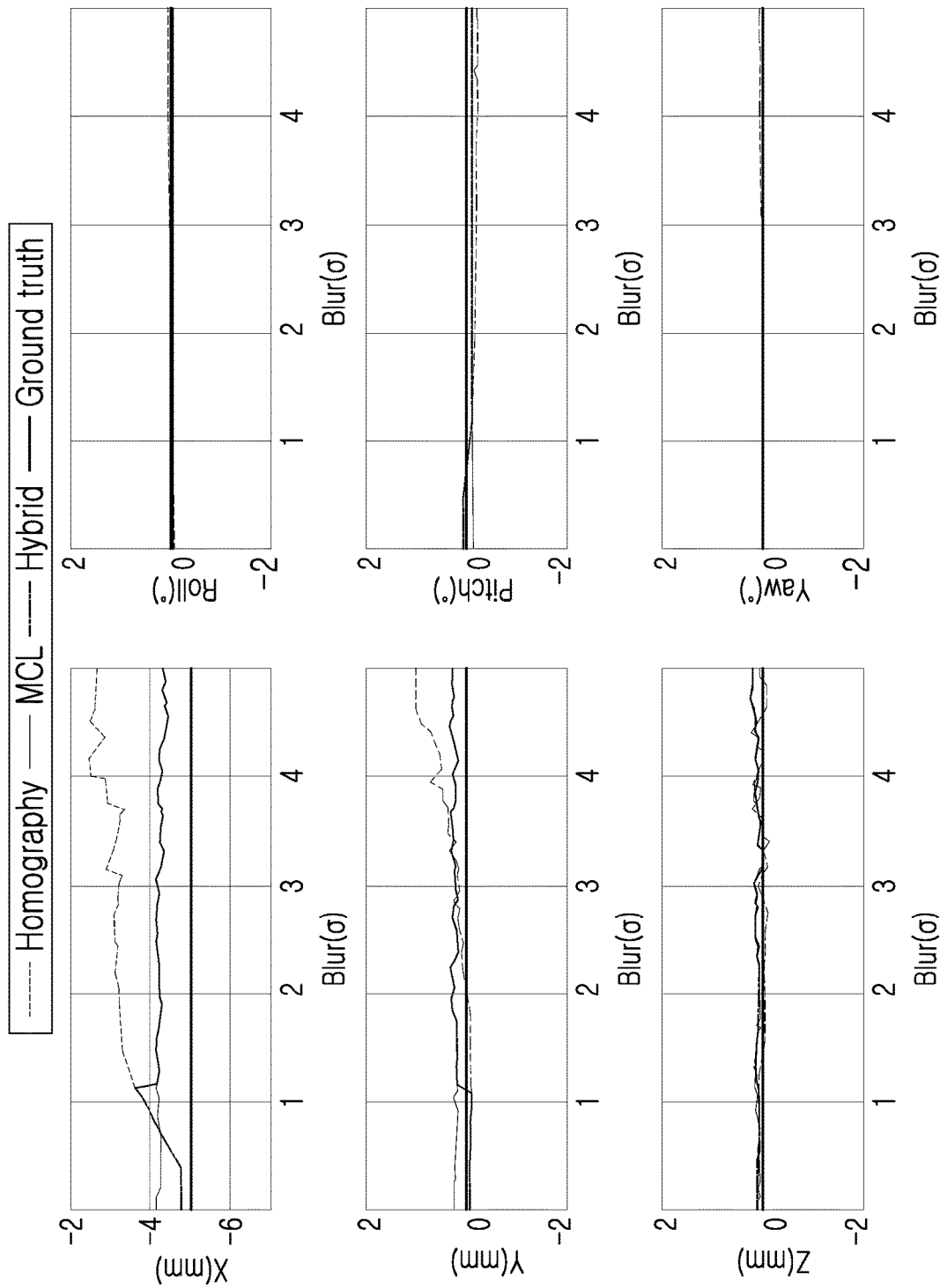
FIG. 20 illustrates an example of a graph for homography estimation method, MCL (Monte Carlo Localization) method, and hybrid method according to blur.

Also, when blur occurs on an image, errors may be reduced through a hybrid of homography and MCL method. A blur is formed at −5 mm point to X-axis direction in order to assume that blur occurs in a situation that assembly of a member is almost done, and when the blur is Gaussian blur and the blur randomly occurs (σ=0~5), homography and MCL methods are hybridized. As shown in FIG. 20 that the hybrid method and ground truth are compared and Table 1 comparing errors, it may be known that errors by hybrid method may be more reduced than errors of homography and MCL method, and may estimate more precise 6-DOF compared to other methods.

In Table 3, H.G means homography, Hybrid means hybrid method hybridizing homography and MCL methods, Linear av. means average of errors, and Angular av. means average of rotation errors.

TABLE 3

| Method | X(mm) | Y(mm) | Z(mm) | Linear av.(mm) | Roll(°) | Pitch(°) | Yaw(°) | Angular av.(°) |
|---|---|---|---|---|---|---|---|---|
| H.G.   | 1.525 | 0.351 | 0.061 | 1.566 | 0.020 | 0.137 | 0.014 | 0.057 |
| MCL    | 0.729 | 0.197 | 0.085 | 0.760 | 0.022 | 0.119 | 0.013 | 0.051 |
| Hybrid | 0.711 | 0.180 | 0.085 | 0.739 | 0.021 | 0.106 | 0.013 | 0.047 |

Figure 21:
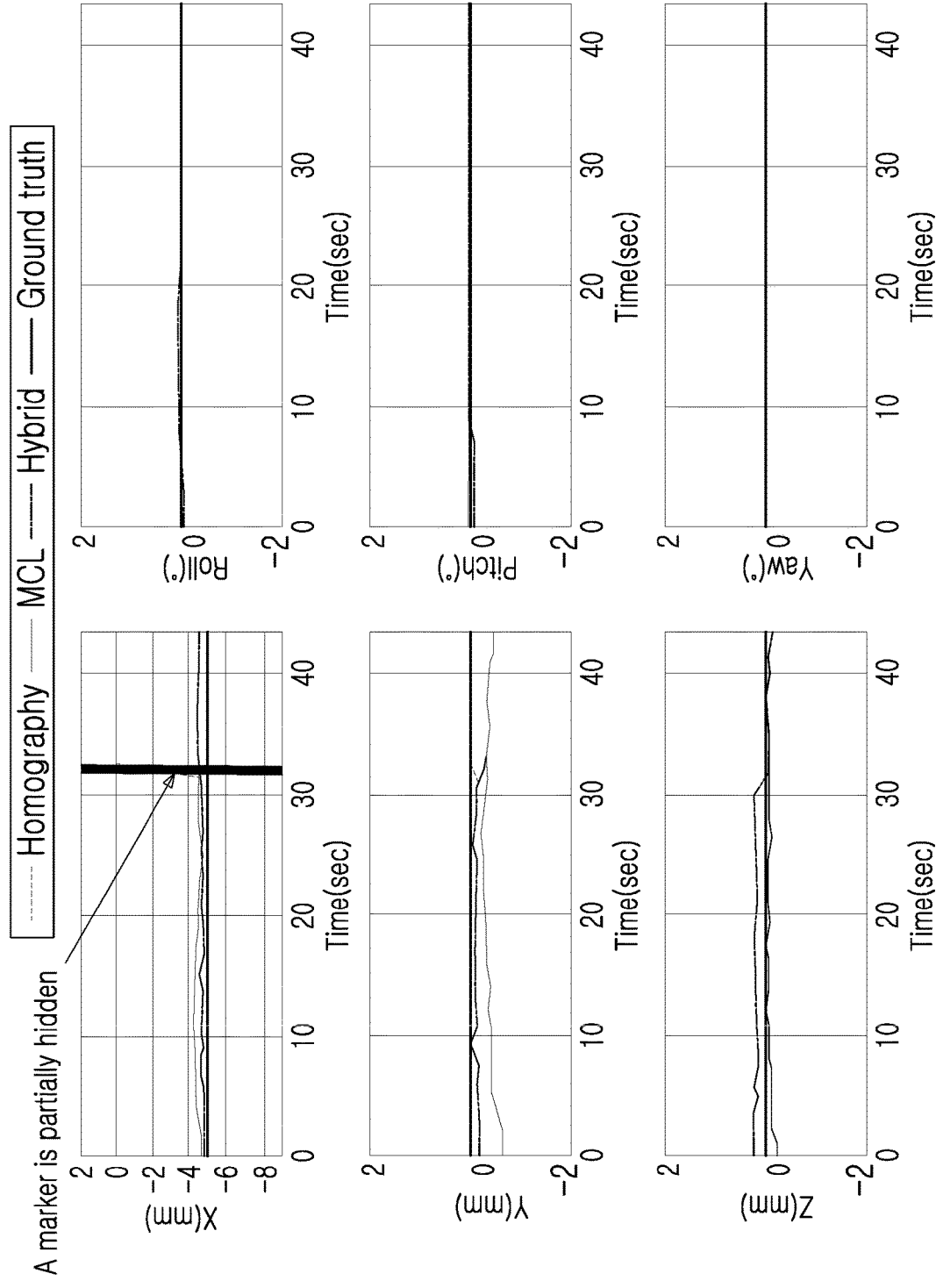
FIG. 21 illustrates an example of a graph for homography estimation method, MCL (Monte Carlo Localization) method, and hybrid method according to occlusion of marker.

FIG. 21 illustrates an example of a graph for homography estimation method, Monte Carlo Localization method, and hybrid method according to occlusion of a marker, and relates to a case of an experiment at −5 mm point to X-axis direction and N=200, $N_R$=20, $N_L$=9 in order to assume that occlusion of a marker occurs in a situation that assembly of a member is almost done. Table 4 compares errors depending on occlusion of a marker.

As shown on FIG. 21 and Table 4, when a part of one marker among two markers is occluded, two markers may not be observed, and 6-DOF of homography approaches to 0 from 32 seconds point, but because MCL has 6-DOF in particles and may calculate importance weight operation through a relation with partially visible edge of a marker when a part of the marker is occluded, 6-DOF displacement may be measured from MCL method.

Also, when comparing based on average of linear errors, it may be known that because hybrid algorithm has fewer errors than homography or MCL, hybrid method may precisely estimate 6-DOF.

TABLE 4

| Method | X(mm) | Y(mm) | Z(mm) | Linear av.(mm) | Roll(°) | Pitch(°) | Yaw(°) | Angular av.(°) |
|---|---|---|---|---|---|---|---|---|
| H.G. | 2.066 | 0.064 | 0.099 | 2.070 | 0.016 | 0.020 | 0.008 | 0.015 |
| MCL | 0.447 | 0.269 | 0.092 | 0.531 | 0.024 | 0.027 | 0.010 | 0.020 |
| Hybrid | 0.296 | 0.151 | 0.108 | 0.350 | 0.020 | 0.024 | 0.009 | 0.018 |

According to the present invention, the method may be implemented with an apparatus or a system.

For example, the subsystem illustrated in FIGS. 1 and 3 may be implemented with an apparatus performing the method, and may be implemented with a system including a subsystem and a main system when including visualization process.

Particularly, the subsystem may include functional configuration means, for example, an acquiring unit, an extracting unit, a selecting unit, and an estimating unit which are performed by at least one processor.

The acquiring unit is a configuration means acquiring images of a first marker attached to a fixing member and a second marker attached to a dynamic member for assembling to the fixing member by using a camera.

The extracting unit is a configuration means extracting a feature point of the first marker and a feature point of the second marker through image processing for the acquired images.

Here, the extracting unit may convert the acquired images to gray images and then preprocess them by using a bilateral filter, convert the preprocessed gray images to binarization images, and extract the feature point of the first marker and the feature point of the second marker from the binarization images by using a blob algorithm.

The selecting unit is a configuration means determining whether there are at least partially occlusion and blur for the markers from the acquired images, and selecting any one method among a homography estimation method and a probability-based location estimation method based on the determining result.

Here, the selecting unit may select the probability-based location estimation method when at least partially occlusion occurs for the markers, select the homography estimation method if a second average is above a first average by comparing the first average for distance difference between pixel point of linear equation inferred from feature point of corresponding marker in importance weight operation of the probability-based location estimation method and each edge of the corresponding marker and the second average for distance difference between the pixel point and particle having the largest important weight of the probability-based location estimation method when the at least partially occlusion does not occur and the blur occurs, and select the probability-based location estimation method if the second average is below the first average.

The estimating unit is a configuration means estimating 6-DOF relative displacement of the dynamic member for the fixing member based on the extracted feature point of the first marker and feature point of the second marker and estimation method selected by the selecting unit.

Surely, the estimating unit may estimate 6-DOF relative displacement by using the homography estimation method when the selecting unit is selectively removed in an apparatus, estimate 6-DOF relative displacement of the dynamic member for the fixing member by using the homography estimation method, and estimate final 6-DOF relative displacement of the dynamic member for the fixing member by using the probability-based location estimation method which inputs the estimated 6-DOF relative displacement of the dynamic member.

Because the process estimating 6-DOF by using the homography estimation method and the process estimating 6-DOF by using MCL method in the estimating unit are already described in detail in above method, the description thereof will be omitted.

Furthermore, when configuring with a system, the main system may include a visualizing unit, and the visualizing unit is a configuration means visualizing the dynamic member with respect to the fixing member based on the 6-DOF relative displacement estimated by the estimating unit. Visualization information for the estimated 6-DOF may be displayed on a user terminal, for example, a tablet PC by the visualizing unit.

Although the description is omitted in the apparatus and the system, the apparatus and the system may include all contents described in FIGS. 1 to 21 and may include all functions and contents relating to estimating DOF, which is clear to those skilled in the art.

The units described herein may be implemented using hardware components, software components, and/or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The example embodiments may be recorded in non-transitory computer-readable media including program instructions to implement various operations embodied by a computer. The media may also include, alone or in combination with the program instructions, data files, data structures, and the like. The media and program instructions may be those specially designed and constructed for the purposes of the present disclosure, or they may be of the kind well-known and available to those having skill in the computer software arts. Examples of non-transitory computer-readable media include magnetic media such as hard disks, floppy disks, and magnetic tape; optical media such as CD ROM disks and DVD; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments.

While certain example embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method for estimating 6-DOF relative displacement comprising:
   acquiring images of a first marker attached to a fixing member and a second marker attached to a dynamic member for assembling to the fixing member by using a camera;
   extracting a feature point of the first marker and a feature point of the second marker through image processing for the acquired images; and
   estimating 6-DOF relative displacement of the dynamic member for the fixing member based on the extracted feature point of the first marker and feature point of the second marker,
   wherein the estimating 6-DOF relative displacement estimates 6-DOF relative displacement of the dynamic member for the fixing member by using a homography estimation method, and estimates final 6-DOF relative displacement of the dynamic member for the fixing member by using a probability-based location estimation method which inputs the 6-DOF relative displacement of the dynamic member estimated by the homography estimation method,
   wherein the estimating 6-DOF relative displacement initializes particles based on the 6-DOF relative displacement estimated by the homography estimation method, performs sampling by applying change amount of the 6-DOF relative displacement to the initialized particles, resets importance weight for each of particles through normalization process after calculating importance weight of each of the sampled particles, and estimates the final 6-DOF relative displacement based on average of particles having the predetermined number of top importance weights among the reset importance weights.

2. The method of claim 1, wherein the estimating 6-DOF relative displacement estimates 6-DOF relative displacement between the camera and the first marker by using the extracted feature point of the first marker, estimates 6-DOF relative displacement between the camera and the second marker by using the extracted feature point of the second marker, and estimates 6-DOF relative displacement of the dynamic member for the fixed member based on the 6-DOF relative displacement between the camera and the first marker and the 6-DOF relative displacement between the camera and the second marker.

3. The method of claim 1, wherein the estimating 6-DOF relative displacement estimates the 6-DOF relative displacement by using a homography estimation method.

4. The method of claim 1, wherein the extracting a feature point converts the acquired images to gray images and then preprocesses them by using a bilateral filter, converts the preprocessed gray images to binarization images, and extracts the feature point of the first marker and the feature point of the second marker from the binarization images by using a blob algorithm.

5. The method of claim 1 further comprising visualizing the dynamic member with respect to the fixing member based on the estimated 6-DOF relative displacement.

6. The method of claim 1, wherein the first marker and the second marker have different identification information, and comprise a plurality of corner points corresponding to the feature point.

7. A method for estimating 6-DOF relative displacement comprising:
   acquiring images of a first marker attached to a fixing member and a second marker attached to a dynamic member for assembling to the fixing member by using a camera;
   extracting a feature point of the first marker and a feature point of the second marker through image processing for the acquired images;
   determining whether there is at least partially occlusion or blur for the markers from the acquired images, and selecting any one method among a homography estimation method and a probability-based location estimation method based on the determining result; and
   estimating 6-DOF relative displacement of the dynamic member for the fixing member based on the selected any one method, the extracted feature point of the first marker and feature point of the second marker.

8. The method of claim 7, wherein the selecting any one method selects the probability-based location estimation method when at least partially occlusion occurs for the markers, selects the homography estimation method if a second average is above a first average by comparing the first average for distance difference between pixel point of linear equation inferred from feature point of corresponding marker in importance weight operation of the probability-based location estimation method and each edge of the corresponding marker and the second average for distance difference between the pixel point and particle having the largest importance weight of the probability-based location estimation method when the at least partially occlusion does not occur and the blur occurs, and selects the probability-based location estimation method if the second average is below the first average.

9. An apparatus for estimating 6-DOF relative displacement comprising:
   an acquiring unit configured to acquire images of a first marker attached to a fixing member and a second marker attached to a dynamic member for assembling to the fixing member by using a camera;
   an extracting unit configured to extract a feature point of the first marker and a feature point of the second marker through image processing for the acquired images;

an estimating unit configured to estimate 6-DOF relative displacement of the dynamic member for the fixing member based on the extracted feature point of the first marker and feature point of the second marker; and a selecting unit configured to determine whether there is at least partially occlusion and blur for the markers from the acquired images, and select any one method among a homography estimation method and a probability-based location estimation method based on the determining result, wherein the estimating unit estimates 6-DOF relative displacement of the dynamic member for the fixing member based on the selected one method, the extracted feature point of the first marker and feature point of the second marker.

10. The apparatus of claim 9, wherein the estimating unit estimates 6-DOF relative displacement between the camera and the first marker by using the extracted feature point of the first marker, estimates 6-DOF relative displacement between the camera and the second marker by using the extracted feature point of the second marker, and estimates 6-DOF relative displacement of the dynamic member for the fixing member based on the 6-DOF relative displacement between the camera and the first marker and the 6-DOF-relative displacement between the camera and the second marker.

11. The apparatus of claim 9, wherein the estimating unit estimates the 6-DOF relative displacement by using a homography estimation method.

12. The apparatus of claim 9, wherein the estimating unit estimates the 6-DOF relative displacement of the dynamic member for the fixing member by using a homography method, and estimates final 6-DOF relative displacement of the dynamic member for the fixing member by using a probability-based location estimation method which inputs the 6-DOF relative displacement estimated by the homography method.

13. The apparatus of claim 12, wherein the estimating unit initializes particles based on the 6-DOF relative displacement estimated by the homography estimation method, performs sampling by applying change amount of the 6-DOF relative displacement to the initialized particles, resets importance weight for each of particles through normalization process after calculating importance weight of each of the sampled particles, and estimates the final 6-DOF relative displacement based on average of particles having the predetermined number of top importance weights among the reset importance weights.

14. The apparatus of claim 9, wherein the extracting unit converts the acquired images to gray images and then preprocesses them by using a bilateral filter, converts the preprocessed gray images to binarization images, and extracts the feature point of the first marker and the feature point of the second marker from the binarization images by using a blob algorithm.

15. The apparatus of claim 9, wherein the first marker and the second marker have different identification information, and comprise a plurality of corner points corresponding to the feature point.

16. The apparatus of claim 9, wherein the selecting unit selects the probability-based location estimation method when at least partially occlusion occurs for the markers, selects the homography estimation method if a second average is above a first average by comparing the first average for distance difference between pixel point of linear equation inferred from feature point of corresponding marker in importance weight operation of the probability-based location estimation method and each edge of the corresponding marker and the second average for distance difference between the pixel point and particle having the largest importance weight of the probability-based location estimation method when the at least partially occlusion does not occur and the blur occurs, and selects the probability-based location estimation method if the second average is below the first average.

17. A method for estimating 6-DOF relative displacement comprising:

acquiring images of a first marker attached to a fixing member and a second marker attached to a dynamic member for assembling to the fixing member by using a camera;

extracting a feature point of the first marker and a feature point of the second marker through image processing for the acquired images;

determining whether there is blur for the makers from the acquired images, and selecting any one method among a homography estimation method and a probability-based location estimation method based on importance weight operation result of the probability-based location estimation method when the blur occurs; and estimating 6-DOF relative displacement of the dynamic member for the fixing member based on the selected any one method, the extracted feature point of the first marker and feature point of the second marker.

* * * * *